United States Patent
Ogura et al.

(10) Patent No.: US 11,644,556 B2
(45) Date of Patent: May 9, 2023

(54) POSITION MEASUREMENT DEVICE, POSITION MEASUREMENT METHOD, AND PROGRAM RECORDING MEDIUM

(71) Applicant: NEC Corporation, Tokyo (JP)

(72) Inventors: Kazumine Ogura, Tokyo (JP); Shingo Yamanouchi, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 683 days.

(21) Appl. No.: 16/620,950

(22) PCT Filed: Jun. 18, 2018

(86) PCT No.: PCT/JP2018/023050
§ 371 (c)(1),
(2) Date: Dec. 10, 2019

(87) PCT Pub. No.: WO2018/235757
PCT Pub. Date: Dec. 27, 2018

(65) Prior Publication Data
US 2020/0209377 A1    Jul. 2, 2020

(30) Foreign Application Priority Data

Jun. 20, 2017  (JP) .............................. JP2017-120117

(51) Int. Cl.
*G01S 13/08* (2006.01)
*G01S 13/04* (2006.01)

(52) U.S. Cl.
CPC .............. *G01S 13/08* (2013.01); *G01S 13/04* (2013.01)

(58) Field of Classification Search
CPC .......... G01S 17/93; G01S 17/04; G01S 17/08; G01S 13/04; G01S 13/886; G01S 13/93;
(Continued)

(56) References Cited

U.S. PATENT DOCUMENTS 4,673,938 A * 6/1987 Phillips ................... G01S 13/72
342/95
4,914,734 A * 4/1990 Love .................... G01C 21/005
342/64

(Continued)

FOREIGN PATENT DOCUMENTS

JP           04363689 A       12/1992
JP     2002257925 A *  9/2002  ............. G01S 13/04
(Continued)

OTHER PUBLICATIONS

Kohei Sato, et al., "Experimental Study on Tracking of Multiple-Moving Persons in Indoor Environment Using MIMO Doppler Radar", Proceedings of the IEICE general conference (CD-ROM), vol. 2015, p.ROMBUNNO_BS-I-5, Feb. 2015, 2 pages.

(Continued)

*Primary Examiner* — Bernarr E Gregory
*Assistant Examiner* — Michael W Justice
(74) *Attorney, Agent, or Firm* — Sughrue Mion, PLLC

(57) ABSTRACT

A position measurement device which includes: a storage unit that stores area information for setting a first region along a boundary of the specific area; an area setting unit that acquires the area information from the storage unit and sets the first region on the basis of the acquired area information; and a position measurement unit that acquires the first region from the area setting unit, sets the acquired first region as a verification region, measures the position of the object located in the verification region, and updates the area information stored in the storage unit.

10 Claims, 23 Drawing Sheets

(58) Field of Classification Search
CPC .......... G01S 13/66; G01S 13/88; G01S 13/08; G01S 7/4817
USPC ....... 342/118, 146, 107, 27, 147; 455/456.1, 455/456.2
See application file for complete search history.

(56) References Cited

U.S. PATENT DOCUMENTS

| | | | | |
|---|---|---|---|---|
| 7,095,488 | B2* | 8/2006 | Jamieson | G01S 7/4811 |
| | | | | 356/5.01 |
| 9,651,659 | B2* | 5/2017 | Vinski | G01S 13/82 |
| 9,758,098 | B2* | 9/2017 | Aimura | G08G 1/166 |
| 9,769,374 | B2* | 9/2017 | Moeller | H04N 5/144 |
| 10,343,717 | B2* | 7/2019 | Ohsugi | B62D 15/0265 |
| 10,345,442 | B2* | 7/2019 | Sasabuchi | G01S 13/931 |
| 10,960,877 | B2* | 3/2021 | Matsunaga | B60R 21/00 |
| 11,124,163 | B2* | 9/2021 | Fujita | B60W 30/0953 |
| 2003/0164790 | A1* | 9/2003 | Kurita | G01S 13/04 |
| | | | | 340/541 |
| 2004/0141170 | A1* | 7/2004 | Jamieson | G01S 17/89 |
| | | | | 356/612 |
| 2011/0063113 | A1* | 3/2011 | Hook | G01S 13/82 |
| | | | | 340/572.1 |
| 2014/0044311 | A1* | 2/2014 | Takahashi | G06V 20/588 |
| | | | | 382/103 |
| 2015/0054676 | A1* | 2/2015 | Vinski | G08G 1/0116 |
| | | | | 342/51 |
| 2016/0176339 | A1* | 6/2016 | Aimura | B60Q 9/008 |
| | | | | 701/301 |
| 2017/0195544 | A1* | 7/2017 | Moeller | G06V 40/20 |
| 2017/0199274 | A1* | 7/2017 | Sasabuchi | G01S 13/867 |
| 2018/0154935 | A1* | 6/2018 | Ohsugi | G01S 17/42 |
| 2018/0370531 | A1* | 12/2018 | Matsunaga | G08G 1/166 |
| 2019/0023239 | A1* | 1/2019 | Fujita | G01S 13/867 |

FOREIGN PATENT DOCUMENTS

| | | | |
|---|---|---|---|
| JP | 2002257925 A | | 9/2002 |
| JP | 2004085363 A | | 3/2004 |
| JP | 2006010410 A | | 1/2006 |
| JP | 2006126133 A | * | 5/2006 |
| JP | 2006126133 A | | 5/2006 |
| JP | 2006308542 A | | 11/2006 |
| JP | 2009128016 A | | 6/2009 |
| JP | 2009282641 A | | 12/2009 |
| JP | 2010044496 A | | 2/2010 |

OTHER PUBLICATIONS

International Search Report in application No. PCT/JP2018/023050 from the International Bureau dated Sep. 18, 2018.

* cited by examiner

Fig.4

| INFORMATION NAME | VALUE |
|---|---|
| SPECIFIC AREA COORDINATE | (x1, y1), (x2, y2), (x3, y3), (x4, y4) |
| STEP-IN COORDINATE | (x5, y5), (x6, y6), (x7, y7), (x8, y8) |
| STEP-IN RANGE | 10 (m) |
| TARGET IDENTIFIER | 111, 112 |
| TARGET POSITION | (x9, y9), (x10, y10) |
| TARGET SPEED | 2 (m/s) |
| TRACKING RANGE | 5 (m) |
| PREVIOUS SCAN TIME | 2017/03/16/17:40:24.51 |

INFORMATION TABLE 140

POSITION MEASUREMENT DEVICE, POSITION MEASUREMENT METHOD, AND PROGRAM RECORDING MEDIUM

This application is a National Stage Entry of PCT/JP2018/023050 filed on Jun. 18, 2018, which claims priority from Japanese Patent Application 2017-120117 filed on Jun. 20, 2017, the contents of all of which are incorporated herein by reference, in their entirety.

TECHNICAL FIELD

The present invention relates to a position measurement device, a position measurement method, and a program which measure a position of a target.

BACKGROUND ART

There is a technique of receiving a reflected wave of an electromagnetic wave transmitted toward a range including a specific area, and performing, by using the received reflected wave, position measurement of a target located in the specific area. For example, presence or absence of a target can be determined by scanning a reflected wave for each section uniquely determined by a distance and an angle from an antenna which transmits and receives an electromagnetic wave, and measuring spectral intensity of the section. Generally, in position measurement of a target in a specific area, all sections covering the whole specific area are scanned.

NPL 1 discloses a tracking technique of scanning all sections of a specific area, and, when a target is discovered, performing position measurement by restricting a scan range to a region including the target. The technique of NPL 1 performs position measurement for all sections in a specific area with low frequency, and, when a target is discovered at a certain scan opportunity, performs position measurement with high frequency at a next scan opportunity, mainly for a region to which the target seems to move.

PTL 1 discloses a radar device which uses beat signals acquired from a plurality of antennas, and detects a target at a plurality of detection angles. The device of PTL 1 selects a target for calculation from detected targets, and changes, based on position information of the target for calculation, an interval between some detection angles among a plurality of detection angles at which a target is detected next, in such a way as to be different from an interval between other detection angles. The device of PTL 1 enables to set a small interval between inspection angles of an angle range requiring detailed sensing, and set a large interval between other inspection angles, and therefore, enables to improve detection accuracy of a target, and shorten a detection time of the target.

CITATION LIST

Patent Literature

[PTL 1] Japanese Unexamined Patent Application Publication No. 2009-128016

Non Patent Literature

[NPL 1] Kohei Sato, Hiroyoshi Yamada, Hiroyuki Tsuji, Yoshio Yamaguchi, "Experimental Study on Tracking of Multiple-Moving Persons in Indoor Environment Using MIMO Doppler Radar", Proceedings of the IEICE general conference (CD-ROM), vol. 2015, p.ROMBUNNO BS-1-5, February 2015.

SUMMARY OF INVENTION

Technical Problem

A general position measurement technique has a problem that detection of spectral intensity is performed in all sections in a specific area, and therefore, a scan time becomes long.

In contrast, the techniques of NPL 1 and PTL 1 enable to shorten a scan time by restricting a scan range to a target in a specific area. However, the techniques of NPL 1 and PTL 1 scan all sections of the specific area until discovering a target, and therefore, it takes time to discover a target newly entering the specific area. In other words, the techniques of NPL 1 and PTL 1 have a problem of, when a target newly enters a specific area, being unable to measure a position of the target in the specific area in real time.

In order to solve the problem described above, an object of the present invention is to provide a position measurement device which enables to shorten a time required for detecting a target entering a specific area, and perform position measurement of the target located in the specific area in real time.

Solution to Problem

A position measurement device according to one aspect of the present invention includes: a storage means for storing area information for setting a first region along a boundary of a specific area; an area setting means for acquiring the area information from the storage means, and setting the first region, based on the acquired area information; and a position measurement means for acquiring the first region from the area setting means, setting the acquired first region to a verification region, performing position measurement of a target located in the verification region, and updating the area information stored in the storage means.

A position measurement method according to one aspect of the present invention includes: setting a first region, based on area information acquired from a storage means for storing the area information for setting the first region along a boundary of a specific area; setting the first region to a verification region; performing position measurement of a target located in the verification region; and updating the area information stored in the storage means.

A program according to one aspect of the present invention causes a computer to execute: processing of setting a first region, based on area information acquired from a storage means for storing the area information for setting the first region along a boundary of a specific area; processing of setting the first region to a verification region; processing of performing position measurement of a target located in the verification region; and processing of updating the area information stored in the storage means.

Advantageous Effects of Invention

According to the present invention, it becomes possible to provide a position measurement device which enables to shorten a time required for detecting a target entering a specific area, and perform position measurement of the target located in the specific area in real time.

BRIEF DESCRIPTION OF DRAWINGS

FIG. 4 is a table that compiles information stored in an information storage unit of the position measurement device according to the first example embodiment of the present invention.

EXAMPLE EMBODIMENT

Example embodiments of the present invention will be described below by using the drawings. However, limitation being technically preferable in order to implement the present invention is placed on example embodiments described below, but does not limit the scope of the invention to the description below. Note that, in all the drawings used for description of the example embodiments below, the same reference sign is given to a similar part, unless there is a particular reason. Moreover, in the example embodiments below, a repeated description may be omitted in relation to a similar configuration and operation.

First Example Embodiment

First, a position measurement device according to a first example embodiment of the present invention is described with reference to the drawings. The position measurement device according to the present example embodiment measures a position of a target in a specific area by transmitting an electromagnetic wave to a range including the specific area where position measurement of a target is performed, and receiving and then analyzing a reflected wave of the transmitted electromagnetic wave.

(Configuration)

Figure 1:
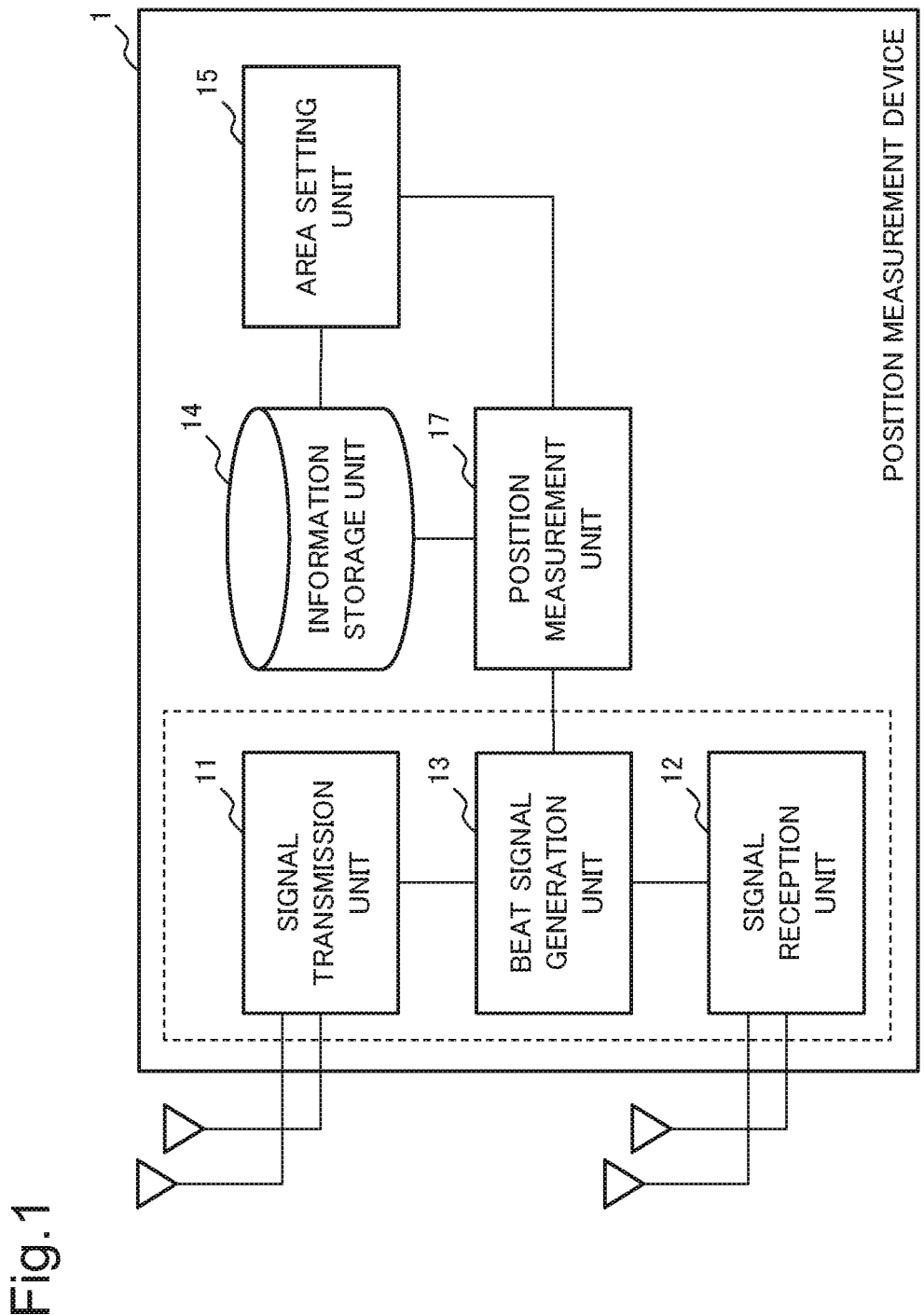
FIG. 1 is a block diagram illustrating a configuration of a position measurement device according to a first example embodiment of the present invention.

FIG. 1 is a block diagram illustrating a configuration of a position measurement device 1 according to the present example embodiment. As in FIG. 1, the position measurement device 1 includes a signal transmission unit 11, a signal reception unit 12, a beat signal generation unit 13, an information storage unit 14, an area setting unit 15, and a position measurement unit 17.

The signal transmission unit 11 generates a transmission signal transmitted toward a measurement target area via a transmission antenna. The signal transmission unit 11 outputs the generated transmission signal to the transmission antenna and the beat signal generation unit 13. A generation signal generated by the signal transmission unit 11 is transmitted toward the measurement target area via at least one transmission antenna. For example, the signal transmission unit 11 generates a pulse wave, a continuous wave, and a frequency modulated continuous wave (hereinafter, FMCW), as a transmission signal. An example using the FMCW is described below.

The signal reception unit 12 receives, as a reception signal, a reflected wave of a transmission signal via at least one reception antenna. The signal reception unit 12 outputs the received reception signal to the beat signal generation unit 13. When there are a plurality of reception antennas, the signal reception unit 12 separately outputs, to the beat signal generation unit 13, reception signals each acquired from each reception antenna.

The beat signal generation unit 13 acquires a transmission signal from the signal transmission unit 11, and acquires a reception signal from the signal reception unit 12. The beat signal generation unit 13 generates an intermediate frequency signal (hereinafter, an IF signal) by synthesizing the acquired transmission signal and the reception signal. The beat signal generation unit 13 outputs the generated IF signal to the position measurement unit 17.

When there are a plurality of transmission antennas or reception antennas, the beat signal generation unit 13 synthesizes a transmission signal and a reception signal for each pair of a transmission antenna and a reception antenna. For example, when transmission antennas are configured by Tx1 and Tx2 and reception antennas are configured by Rx1 and Rx2, four pairs of (Tx1, Rx1), (Tx1, Rx2), (Tx2, Rx1), and (Tx2, Rx2) are formed. In this case, the beat signal generation unit 13 generates an IF signal for each of the four pairs.

The information storage unit 14 (also referred to as a storage unit) stores information (hereinafter, area information) for calculating a step-in area (also referred to as a first region). Moreover, the information storage unit 14 stores information (hereinafter, target information) for calculating a tracking area (also referred to as a second region). Note that, when no tracking area is set, the information storage unit 14 may store area information.

The step-in area is a region set along a boundary of a specific area. Note that, although an example of setting a step-in area inside a boundary of a specific area is described in the present example embodiment, a step-in area may be set outside a boundary of a specific area. Moreover, a step-in area may be a fixed region, or may be a region which dynamically changes in shape and area each time position measurement is performed.

A tracking area is a range in which a target is estimated, based on a past position measurement result, to be located in current position measurement. A tracking area may be set in a range of a fixed distance from a past target position, or may be set in a range in which a distance from a target position dynamically changes.

The area setting unit 15 acquires area information with reference to the information storage unit 14, and sets a step-in area along a boundary of a specific area using the acquired area information. The area setting unit 15 outputs the set step-in area to the position measurement unit 17. Moreover, the area setting unit 15 sets a tracking area for performing position measurement of a target being tracked. The area setting unit 15 outputs the set tracking area to the position measurement unit 17. Note that, when only a target located in a step-in area is targeted for detection, the area setting unit 15 may not set a tracking area.

Figure 2:
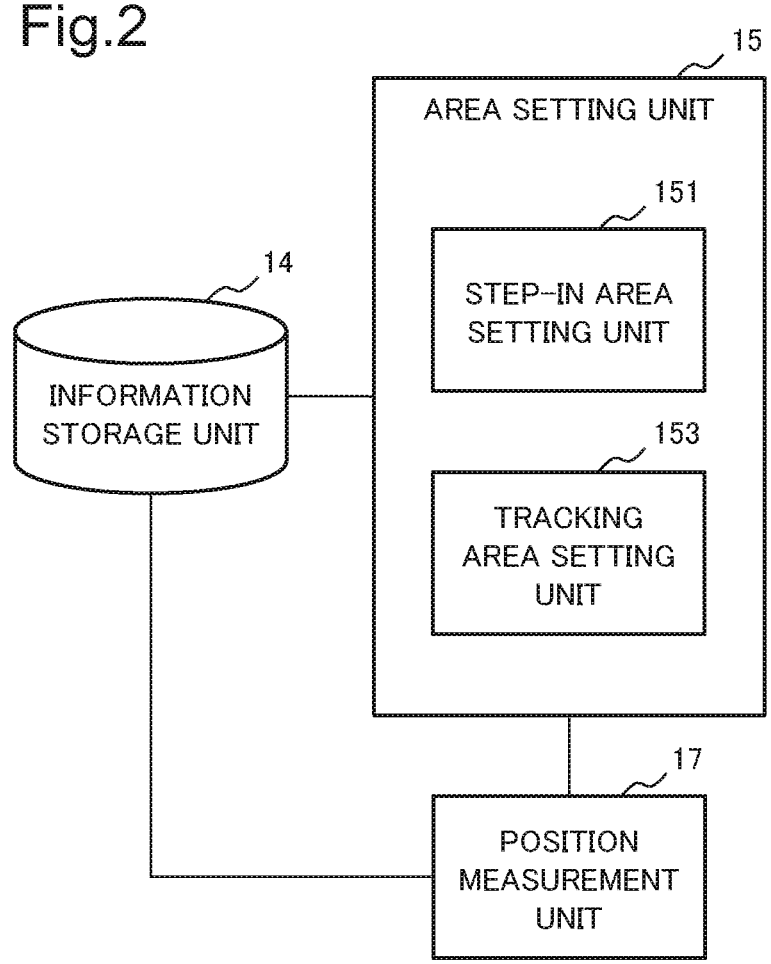
FIG. 2 is a block diagram illustrating a configuration of an area setting unit of the position measurement device according to the first example embodiment of the present invention.

As in FIG. 2, the area setting unit 15 includes a step-in area setting unit 151 (also referred to as a first region setting unit), and a tracking area setting unit 153 (also referred to as a second region setting unit). The step-in area setting unit 151 refers to the information storage unit 14, and sets a step-in area having any width from a boundary of a specific area. The tracking area setting unit 153 refers to the information storage unit 14, and sets a tracking area for performing position measurement of a target being tracked. Note that, when only a target located in a step-in area is targeted for detection, the tracking area setting unit 153 may be omitted.

The position measurement unit 17 has a first function of setting a scan area. The position measurement unit 17 gives the step-in area setting unit 151 an instruction to acquire a step-in area, and acquires the step-in area from the step-in area setting unit 151. Moreover, the position measurement unit 17 gives the tracking area setting unit 153 an instruction to acquire a tracking area, and acquires the tracking area from the tracking area setting unit 153. The position measurement unit 17 sets, to a scan area (also referred to as a verification region), a region combining a tracking area and a step-in area. Note that, when only a target located in a step-in area is targeted for detection, the position measurement unit 17 gives the area setting unit 15 which does not include the tracking area setting unit 153, an instruction to acquire a tracking area. When only a target located in a step-in area is targeted for detection, the position measurement unit 17 sets the step-in area to a scan area.

Moreover, the position measurement unit 17 has a second function of performing position measurement in a scan area. The position measurement unit 17 acquires an IF signal from the beat signal generation unit 13, performs position measurement of a scan area, based on the acquired IF signal, and calculates a position spectrum of a section in the scan area.

Furthermore, the position measurement unit 17 has a third function of updating information in the information storage unit 14. The position measurement unit 17 determines, based on the calculated position spectrum, whether a target is located in an area, and updates, according to a determination result, information held in the information storage unit 14.

The above is the description of an overview of the components of the position measurement device 1 according to the present example embodiment. Note that a configuration (referred to as an intermediate signal generation unit) combining the signal transmission unit 11, the signal reception unit 12, and the beat signal generation unit 13 inside a broken line in FIG. 1 may be configured outside without being included in the position measurement device 1. In this case, the position measurement device 1 may receive an IF signal generated by an intermediate signal generation unit configured outside.

[Measurement Target Area]

Figure 3:
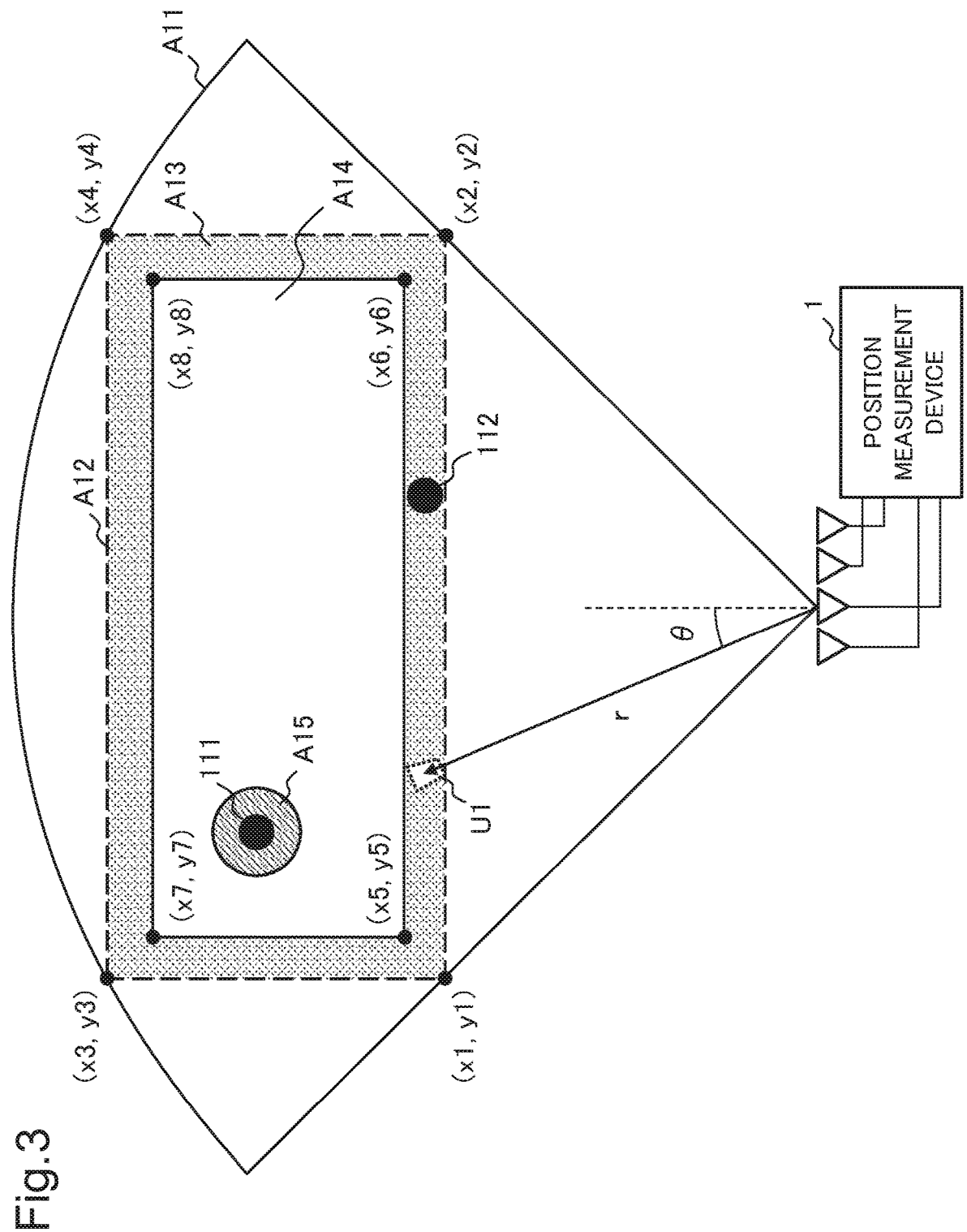
FIG. 3 is a conceptual diagram for describing a measurement target area of the position measurement device according to the first example embodiment of the present invention.

Here, a measurement target area to which a transmission signal is transmitted from the position measurement device 1 is described. FIG. 3 is a conceptual diagram for describing a measurement target area A11 of the position measurement device 1. A specific area A12, a step-in area A13, an internal area A14, and a tracking area A15 are set inside the measurement target area A11.

In the example of FIG. 3, a target 111 and a target 112 are located inside the specific area A12. The target 111 is a target whose position is already measured in previous position measurement. On the other hand, the target 112 is a target which has been located outside the specific area A12 in previous position measurement, but newly entered the specific area A12 in current position measurement.

The measurement target area A11 (inside a fan shape of a full line) is a region in which the position measurement device 1 is able to perform position measurement of a target by a reflected wave of an electromagnetic wave received via an antenna.

The specific area A12 (inside a rectangular shape of a broken line) is a region set within a range of the measurement target area A11 in order for the position measurement device 1 to perform position measurement of a target.

The step-in area A13 (a region between the rectangular shape of the broken line and a rectangular shape of a full line) is a region set along a boundary of the specific area A12. In the example of FIG. 3, the step-in area A13 is set inside the boundary of the specific area A12. Note that, as long as a target entering the specific area A12 can be detected, the step-in area A13 may be set in a part including outside of the boundary of the specific area A12.

The internal area A14 (inside the rectangular shape of the full line) is a region included in the specific area A12 and set inside the step-in area A13.

The tracking area A15 (inside a circular shape of a full line) is a region in which a target is estimated, based on a previous scan result, to be located at current scan timing.

In the present example embodiment, position measurement of all targets located inside the specific area A12 is enabled by performing position measurement of a scan area including the step-in area A13 and the tracking area A15. In the present example embodiment, a region being a scan target is limited, and therefore, position measurement of a target can be performed in a short time as compared with a scheme which scans all regions of the specific area A12.

Now, characteristic components of the position measurement device 1 according to the present example embodiment are described in detail. In relation to the area setting unit 15, description is given below separately for the step-in area setting unit 151 and the tracking area setting unit 153.

[Information Storage Unit]

First, the information storage unit 14 is described. FIG. 4 is a table (an information table 140) indicating one example of information held by the information storage unit 14. The information storage unit 14 holds information including area information and target information.

Area information is information used in order to set the step-in area A13. The information table 140 in FIG. 4 includes, as one example of the area information, a specific area coordinate, a step-in coordinate, and a step-in width. Note that, when the step-in area A13 is set at width from the boundary of the specific area A12, only a step-in range may be included as area information. Moreover, when a width of a step-in area dynamically changes, it is preferable that the information storage unit 14 holds a target speed and a previous scan time (a previous position measurement time) as area information.

A specific area coordinate is a coordinate indicating a range of the specific area A12. In the example of FIG. 3, coordinates (x1, y1), (x2, y2), (x3, y3), and (x4, y4) of four vertexes of the specific area A12 represented by the rectangular shape of the broken line are set as specific area coordinates. Note that, when the specific area A12 is not rectangular, a coordinate indicating a shape of the specific area A12 may be designated as a specific area coordinate. Note that information representing a shape of the specific area A12 may be not a coordinate but a mathematical expression.

When width of the step-in area A13 is a fixed value, a step-in coordinate is a coordinate for calculating the width of the step-in area A13. In the example of FIG. 3, coordinates (x5, y5), (x6, y6), (x7, y7), and (x8, y8) of four vertexes of the internal area A14 represented by the rectangular shape of the full line are step-in coordinates. On the other hand, when width of the step-in area A13 dynamically changes, the width is set using a target speed and a previous scan time.

Target information is information used in order to calculate a tracking area. In FIG. 4, a target identifier and a target position are included in target information.

A target identifier is an identifier uniquely allocated to an individual target. A target identifier is used in order to determine which target has exited when information relating to a target that has exited to outside of the specific area A12 is deleted. Note that, when information about a target determined to be located inside the specific area A12 in the past is preserved, a target identifier may be omitted. From now on, it is assumed that information relating to a target that has exited to the outside of the specific area A12 is deleted, and an example of using a target identifier is described.

A target position is a coordinate indicating a position of a target. A target position is linked with a target identifier uniquely allocated to an individual target.

For example, when the target 111 given a target identifier "111" is located at (x9, y9), and the target 112 given a target identifier "112" is located at (x10, y10), a target position and a target identifier are held as in FIG. 4.

When the tracking area A15 is in a fixed range from a target position, the information storage unit 14 stores a tracking range in addition to a target position and a target identifier. Moreover, when the tracking area A15 dynamically changes, the information storage unit 14 stores a target speed and a previous scan time. Note that, when a plurality of targets are located inside the specific area A12, and a target speed of each target is different, the information storage unit 14 stores a target speed of each target.

Additionally, a tracking area may be set based on a movement prediction model of a target. In this case, the information storage unit 14 stores information relating to movement prediction model generation. For example, information relating to movement prediction model generation includes position information, a measurement time, and the like of a target in the past.

The above is the detailed description of the information storage unit 14. Note that a step-in coordinate, a step-in range, a target speed, and a tracking range may be predetermined fixed values, or may be values input via a non-illustrated user interface (UI).

[Step-in Area Setting Unit]

Next, the step-in area setting unit 151 is described. The step-in area setting unit 151 acquires area information from the information storage unit 14. The step-in area setting unit 151 sets a step-in area, based on the acquired area information, and outputs the set step-in area to the position measurement unit 17.

When a step-in area is fixed, the step-in area setting unit 151 acquires, as area information, a specific area coordinate and at least either a step-in coordinate or a step-in range from the information storage unit 14. The step-in area setting unit 151 sets a step-in area, based on the acquired area information.

When a step-in coordinate is used, the step-in area setting unit 151 sets, to a step-in area, a region between a range set by the step-in coordinate and a range set by the specific area coordinate. On the other hand, when a step-in range is used, the step-in area setting unit 151 sets, to a step-in area, a region having a width of the step-in range from a boundary of the specific area coordinate.

When a step-in area dynamically changes, the step-in area setting unit 151 acquires a specific area coordinate, a target speed, and a previous scan time from the information storage unit 14. In this case, the step-in area setting unit 151 updates the previous scan time held in the information storage unit 14 to a current time. The step-in area setting unit 151 calculates a step-in area range $R_{step-in}$ by applying, to Equation 1, a target speed V and a difference time $T_{diff}$ from the previous scan time to the current time. Note that, in Equation 1, α is a constant.

$$R_{step-in} = \alpha \times V \times T_{diff} \tag{1}$$

As in Equation 1, the step-in area range $R_{step-in}$ is a value being proportional to the target speed V and the difference time $T_{diff}$. A part from the boundary of the specific area A12 to the step-in area range $R_{step-in}$ is a step-in area $A_{step-in}$.

The above is the detailed description of the step-in area setting unit 151.

[Tracking Area Setting Unit]

Next, the tracking area setting unit 153 is described. The tracking area setting unit 153 acquires target information from the information storage unit 14. The tracking area setting unit 153 sets a tracking area, based on the target information acquired from the information storage unit 14, and outputs the set tracking area to the position measurement unit 17.

When a tracking area is fixed, the tracking area setting unit 153 acquires a target position and a tracking range from the information storage unit 14, and sets a tracking area. In relation to the target 111 in FIG. 4, the tracking area setting unit 153 acquires a target position (x9, y9) and a tracking range (5 m), and sets a range with a radius of 5 m around the target position (x9, y9) to a tracking area.

When a tracking area dynamically changes, the tracking area setting unit 153 acquires, as target information, a target position, the target speed V, and a previous scan time. The tracking area setting unit 153 sets a tracking area, based on the acquired target information. In this case, in relation to the target 111 in FIG. 4, the tracking area setting unit 153 updates the previous scan time to a current time. The tracking area setting unit 153 calculates a tracking range $R_{tracking}$ by applying, to Equation 2, the target speed V and a difference time $T_{diff}$ from the previous scan time to the current time. Note that, in Equation 2, $\beta$ is a constant.

$$R_{tracking} = \beta \times V \times T_{diff} \quad (2)$$

A tracking area set for the target 111 is a region with the radius $R_{tracking}$ around the target position (x9, y9). The tracking range $R_{tracking}$ is a value being proportional to the target speed V and the difference time $T_{diff}$. Note that a tracking area is not limited to a circular shape. For example, the tracking range $R_{tracking}$ may be set by using a Kalman filter or the like, based on movement prediction of a target. When the Kalman filter is used, the tracking area setting unit 153 performs movement prediction by acquiring, from the information storage unit 14, past position information of a target and information of a time in which the target is present at the position, and sets a tracking area.

For example, when the number of targets being tracked is N, the tracking area setting unit 153 performs calculation of Equation 2 in relation to each target (N is a natural number). Then, the tracking area setting unit 153 sets, to a tracking area $A_{tracking}$, a union of tracking areas $A_{tracking\_n}$ each set for each target by Equation 3 (n is a natural number).

$$A_{tracking} = A_{tracking\_1} \cup A_{tracking\_2} \cup \ldots \cup A_{tracking\_N} \quad (3)$$

The above is the detailed description of the tracking area setting unit 153.

[Position Measurement Unit]

Next, the position measurement unit 17 is described. The position measurement unit 17 includes the following three functions.

The first function of the position measurement unit 17 is a function of setting a scan area. The position measurement unit 17 sets a scan area using a step-in area acquired from the step-in area setting unit 151, and a tracking area acquired from the tracking area setting unit 153.

The position measurement unit 17 calculates a scan area $A_{scan}$ by the following Equation 4 or 5 using an acquired step-in area $A_{step-in}$ and a tracking area $A_{tracking}$. Note that, in Equation 5, $A_{interest}$ indicates the whole specific area A12.

$$A_{scan} = A_{step-in} \cup A_{tracking} \quad (4)$$

$$A_{scan} = A_{step-in} \cup (A_{tracking} \cap A_{interest}) \quad (5)$$

Equation 4 adds a condition that a region outside the specific area A12 is also designated as the scan area $A_{scan}$ when the tracking area $A_{tracking}$ includes outside of the specific area A12. On the other hand, Equation 5 adds a condition that a region outside the specific area A12 is not designated as the scan area $A_{scan}$ when the tracking area $A_{tracking}$ includes the outside of the specific area A12.

The second function of the position measurement unit 17 is a function of performing position measurement in a scan area. The position measurement unit 17 performs position measurement in a scan area using an IF signal acquired from the beat signal generation unit 13. A section in the scan area $A_{scan}$ is a range included in a set in Expression 6, among sections U ($r_{scan}$, $\theta_{scan}$) represented by a distance $r_{scan}$ and an angle $\theta_{scan}$.

$$\{U(r_{scan}, \theta_{scan})|(r_{scan} \times \cos\theta_{scan}, r_{scan} \times \sin\theta_{scan}) \in A_{scan}\} \quad (6)$$

In the example of FIG. 3, a section U1 is a section inside the step-in area A13 indicated by a distance r and an angle $\theta$.

From now on, a method of calculating spectral intensity of a section U ($r_{scan}$, $\theta_{scan}$) as a position spectrum is illustrated.

Figure 5:
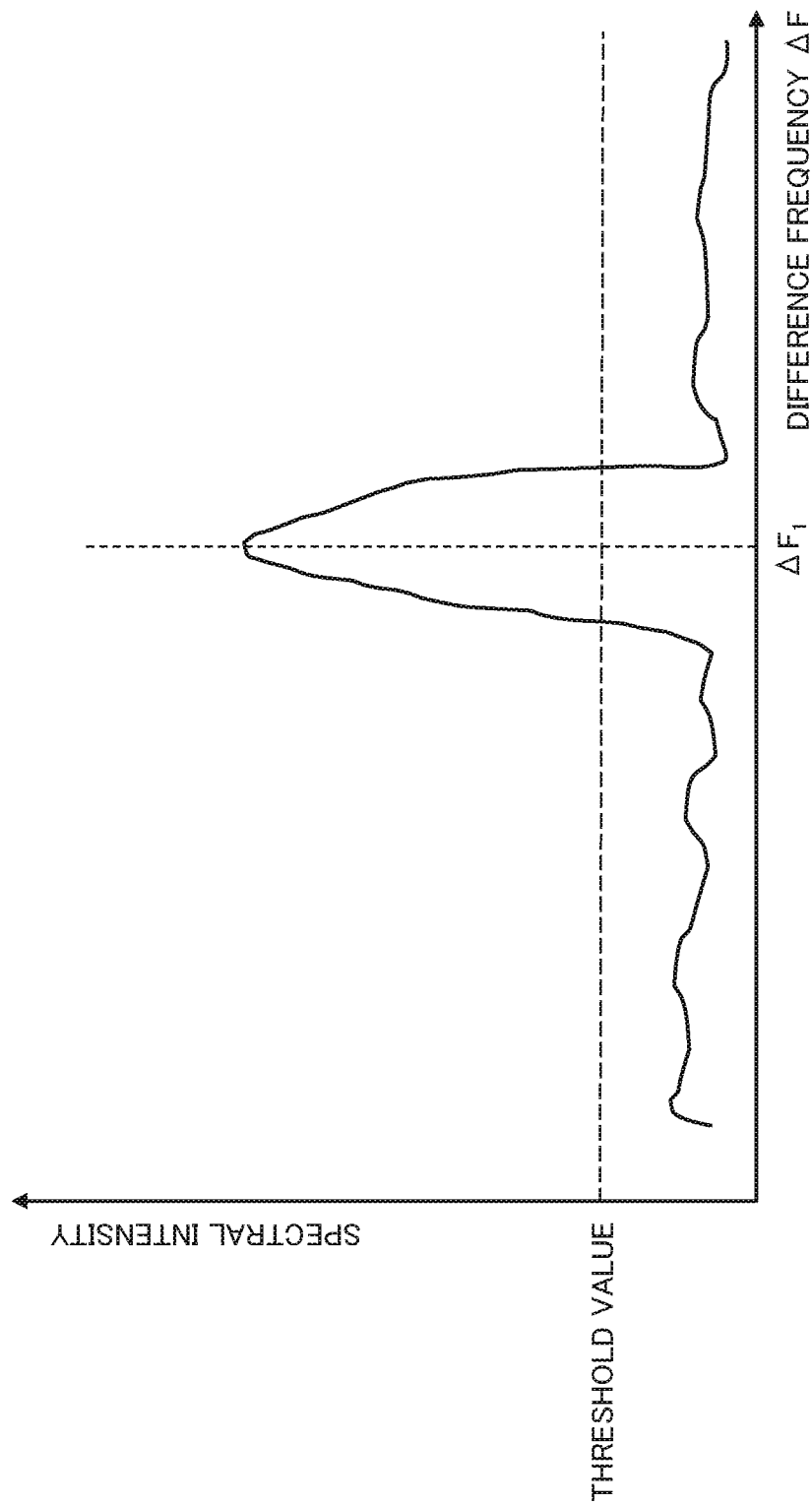
FIG. 5 is a diagram illustrating one example of a range spectrum calculated by a position measurement unit of the position measurement device according to the first example embodiment of the present invention.

First, in order to calculate spectral intensity of a section, the position measurement unit 17 calculates a spectrum (hereinafter, a range spectrum) from the position measurement device 1 to a target. When the FMCW is applied, the position measurement unit 17 calculates a range spectrum $P_{range}$ by Fourier-transforming an IF signal $IF_{signal}$ (Equation 7). FIG. 5 is one example of a graph illustrating a relation between a difference frequency $\Delta F$ calculated by use of Equation 7, and spectral intensity.

$$P_{range} = FFT(IF_{signal}) \quad (7)$$

Figure 6:
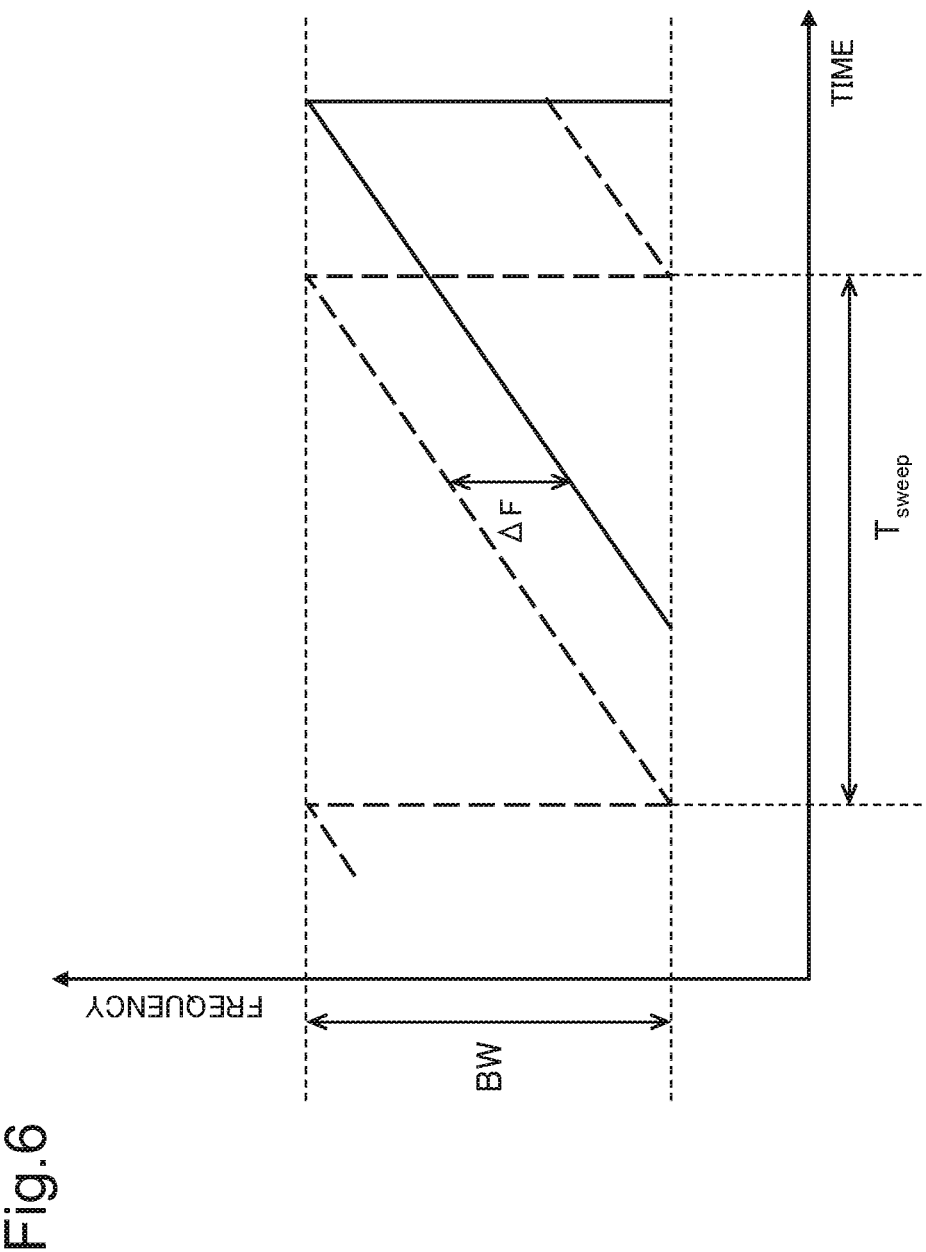
FIG. 6 is a diagram for describing a mechanism in which the position measurement device according to the first example embodiment of the present invention performs distance measurement by using a frequency modulated continuous wave.

FIG. 6 is a graph for describing a mechanism of performing position measurement by applying the FMCW. The position measurement unit 17 calculates a distance r to a target by applying, to Equation 8, the difference frequency $\Delta F$, a sweep time $T_{sweep}$, a frequency bandwidth BW, and a parameter of light speed c.

$$r = \Delta F \times \frac{T_{sweep}}{BW} \times c \quad (8)$$

Next, the position measurement unit 17 calculates a position spectrum of a section by calculating a spectrum of an angle of a target at any distance from the position measurement unit 17. The position measurement unit 17 detects a direction of the target located at the distance r, by implementing a direction-of-arrival estimation method for a range spectrum $P_{range}(r)$ of a distance from a reception antenna to the target. Moreover, the position measurement unit 17 may implement, by using Equation 8, a direction-of-arrival estimation method for a range spectrum of the difference frequency $\Delta F$ associated with the distance r.

An example of using a beamformer method as the direction-of-arrival estimation method is described below. Note that Capon or a linear prediction method may be used as the direction-of-arrival estimation method. Moreover, multiple signal classification (MUSIC) may be used as the direction-of-arrival estimation method. Further, estimation of signal parameters via rotational invariance techniques (ESPRIT) may be used as the direction-of-arrival estimation method.

The position measurement unit 17 uses a weight vector a(θ) expressed by Equation 9, in order to direct a main lobe of an array antenna to the angle θ. Note that, in Equation 9, T indicates a transposed matrix, j indicates an imaginary unit, λ indicates a wavelength of a central frequency, K indicates the number of elements of a reception antenna, and $d_1$ indicates a distance from a reference point of a device to a position of an i-th element.

$$a(\theta) = \begin{bmatrix} \exp\left(-j\frac{2\pi}{\lambda}d_1\sin\theta\right), \exp\left(-j\frac{2\pi}{\lambda}d_2\sin\theta\right), \cdots, \\ \exp\left(-j\frac{2\pi}{\lambda}d_k\sin\theta\right) \end{bmatrix}^T \quad (9)$$

The position measurement unit 17 calculates, as a position spectrum, spectral intensity $P_{position}$ (r, θ) at the distance r and the angle θ, by using Equation 10. Note that the position measurement unit 17 may calculate 0 in a range satisfying the condition of Expression 6. In Equation 10, H represents a conjugate transposed matrix. Moreover, in Equation 10, a correlation matrix $R_{xx}$(r) is calculated from the range spectrum $P_{range}$(r) of any difference frequency component ΔF received from a plurality of reception antennas. Any difference frequency component ΔF is equivalent to any distance.

$$P_{position}(r, \theta) = \frac{a^H(\theta) \times R_{xx}(r) \times a(\theta)}{a^H(\theta) \times a(\theta)} \quad (10)$$

Figure 7:
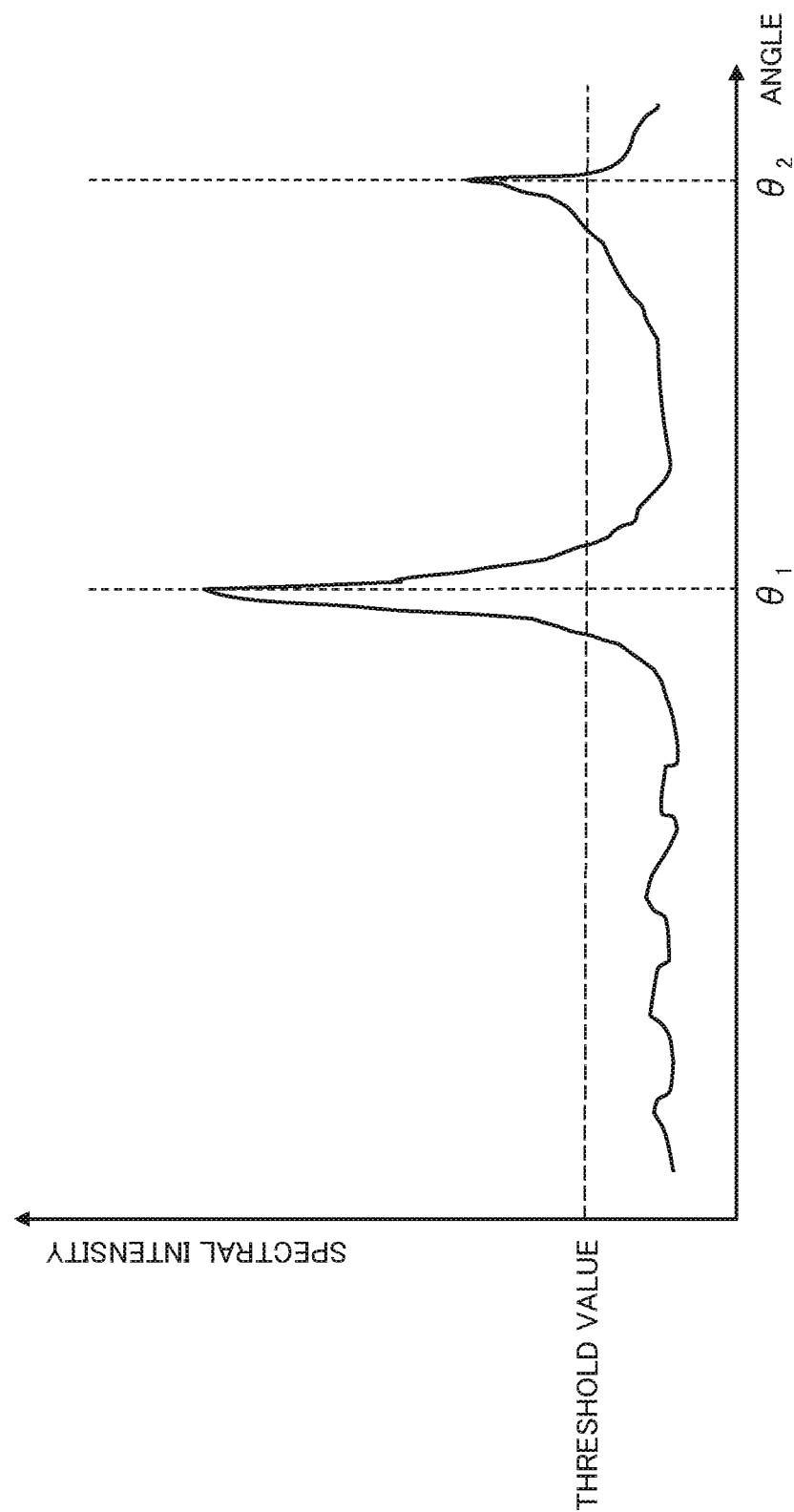
FIG. 7 is a diagram illustrating one example of a result of performing direction-of-arrival estimation by using a range spectrum by the position measurement unit according to the first example embodiment of the present invention.

FIG. 7 is one example of a result of performing direction-of-arrival estimation using a range spectrum at a distance $r_1$ calculated by applying a difference frequency component $\Delta F_1$ exceeding a threshold value in FIG. 5 to Equation 8. The position measurement unit 17 performs position measurement of a target by calculating a position spectrum $P_{position}$ (r, θ) using Equation 10, for the distance $r_{scan}$ and the angle $\theta_{scan}$ satisfying the condition of Expression 6. As above, the position measurement unit 17 calculates the spectral intensity $P_{position}$ (r, θ) in the section U ($r_{scan}$, $\theta_{scan}$) represented by a distance and an angle.

A scan area being a union of a tracking area and a step-in area does not include an internal area, and therefore, has a small area as compared with a specific area. Thus, the number of sections calculated by using Equation 10 is reduced, and a time required for position measurement is shortened by calculating within a range of a scan area, rather than calculating over the whole specific area including the internal area.

The third function of the position measurement unit 17 is a function of updating information in the information storage unit 14. The position measurement unit 17 determines, by using calculated spectral intensity, whether a target is located inside an area, and updates information in the information storage unit 14 according to a determination result. For example, when spectral intensity in a certain section exceeds a preset threshold value, the position measurement unit 17 determines that a target is located in the section.

In FIG. 5, spectral intensity of a spectrum having a peak at difference frequency $\Delta F_1$ exceeds a threshold value. Moreover, in FIG. 7, spectral intensity exceeds a threshold value at angles $\theta_1$ and $\theta_2$, in relation to the distance $r_1$ calculated by using the difference frequency $\Delta F_1$. In other words, the position measurement unit 17 determines that targets are located at positions of coordinates indicated by ($r_1 \cos \theta_1$, $r_1 \sin \theta_1$) and ($r_1 \cos \theta_2$, $r_1 \sin \theta_2$).

When a target is detected in a scan area, the position measurement unit 17 updates or newly registers position information of the target held in the information storage unit 14.

When newly registering position information (target position) of the target in the information storage unit 14, the position measurement unit 17 registers the position information in association with an identifier (target identifier). An identifier may be attached in any way as long as a target being tracked can be identified. For example, the position measurement unit 17 uses a monotonously increasing numeral as an identifier.

On the other hand, in relation to a target which is not detected in a scan area, the position measurement unit 17 deletes information about the target from the information storage unit 14. In the present function, the position measurement unit 17 deletes information about all targets from the information storage unit 14, when no target is detected in a scan area. Moreover, when at least one target is detected in a scan area, the position measurement unit 17 deletes or updates information held in the information storage unit 14, after determining whether or not a target currently being tracked is located inside a specific area. Further, when determining that a target for which a tracking area is set is located outside the area, the position measurement unit 17 deletes information about the target from the information storage unit 14.

Figure 8:
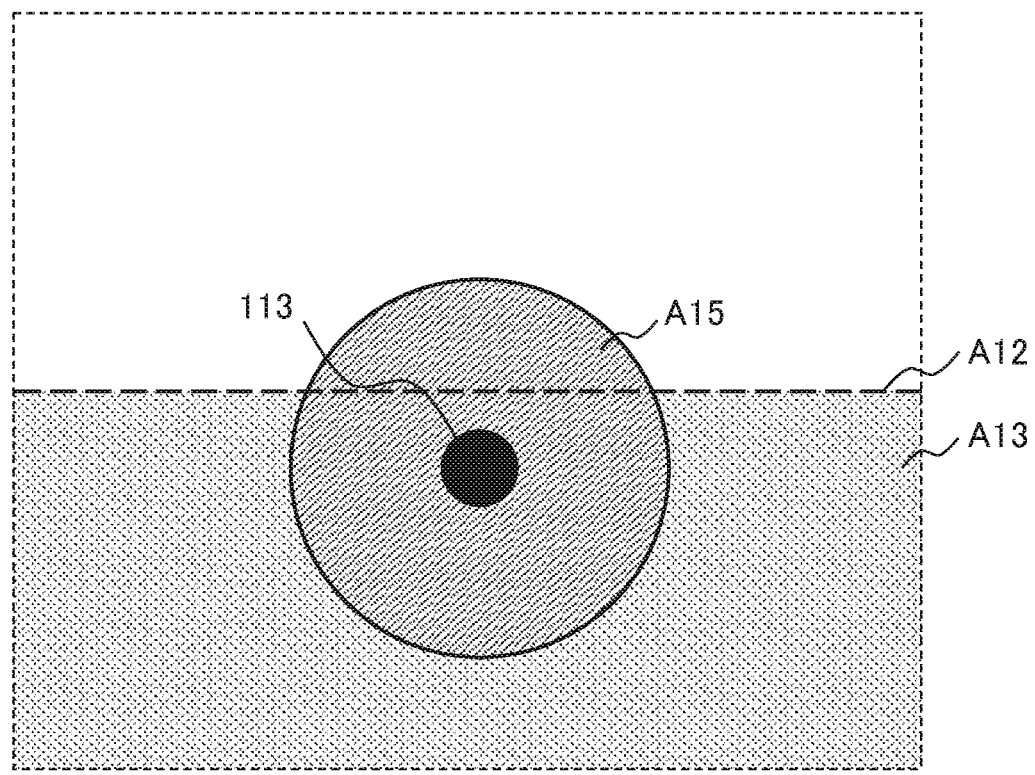
FIG. 8 is a conceptual diagram for describing a mechanism in which a position of a target is determined by the position measurement device according to the first example embodiment of the present invention.

Herein, a method of determining that a target is located outside the specific area A12 is described by use of FIG. 8. In FIG. 8, a target 113 is located in the step-in area A13, and a part of the tracking area A15 set in line with the target 113 includes outside of the specific area A12. An area being the tracking area A15 and being outside the specific area A12 is a region which may not be set to a scan area, as described by using Equations 4 and 5.

In a case of performing position measurement for the whole tracking area A15 (Equation 4), the position measurement unit 17 determines that the target 113 is outside the specific area A12, when a position of the target 113 is outside the specific area A12.

On the other hand, in a case of not performing position measurement for a region being the tracking area A15 and being outside the specific area A12 (Equation 5), the position measurement unit 17 determines that a position of a target is outside the specific area A12, when no target is detected in the tracking area A15.

Figure 9:
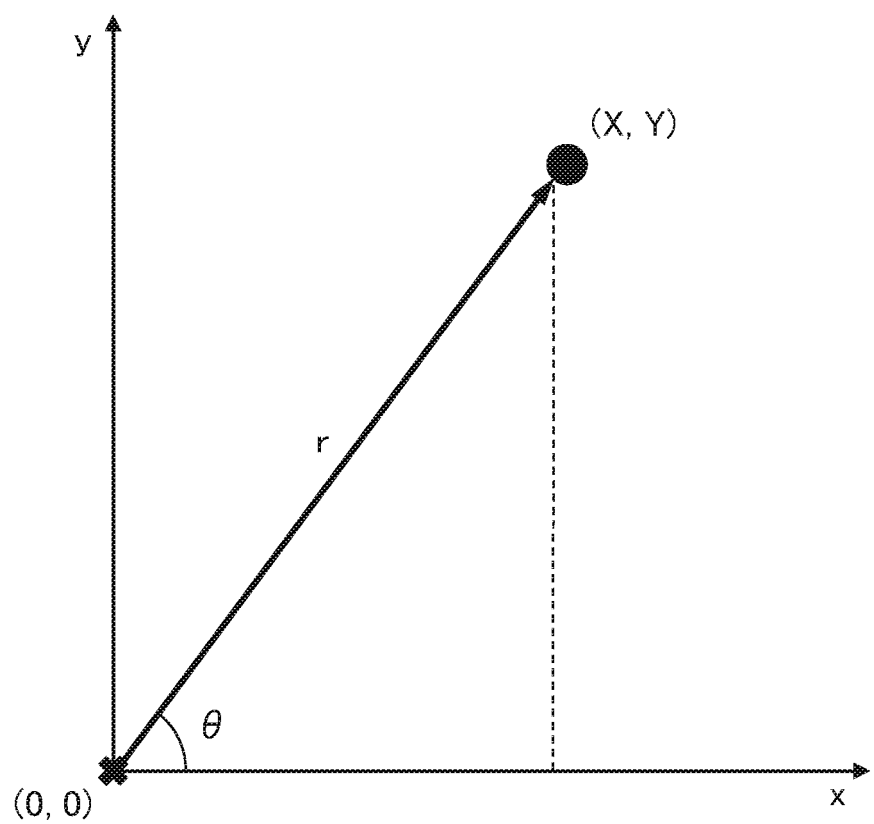
FIG. 9 is a diagram for describing a parameter when the position measurement device according to the first example embodiment of the present invention uses a two-dimension polar coordinate.
Figure 10:
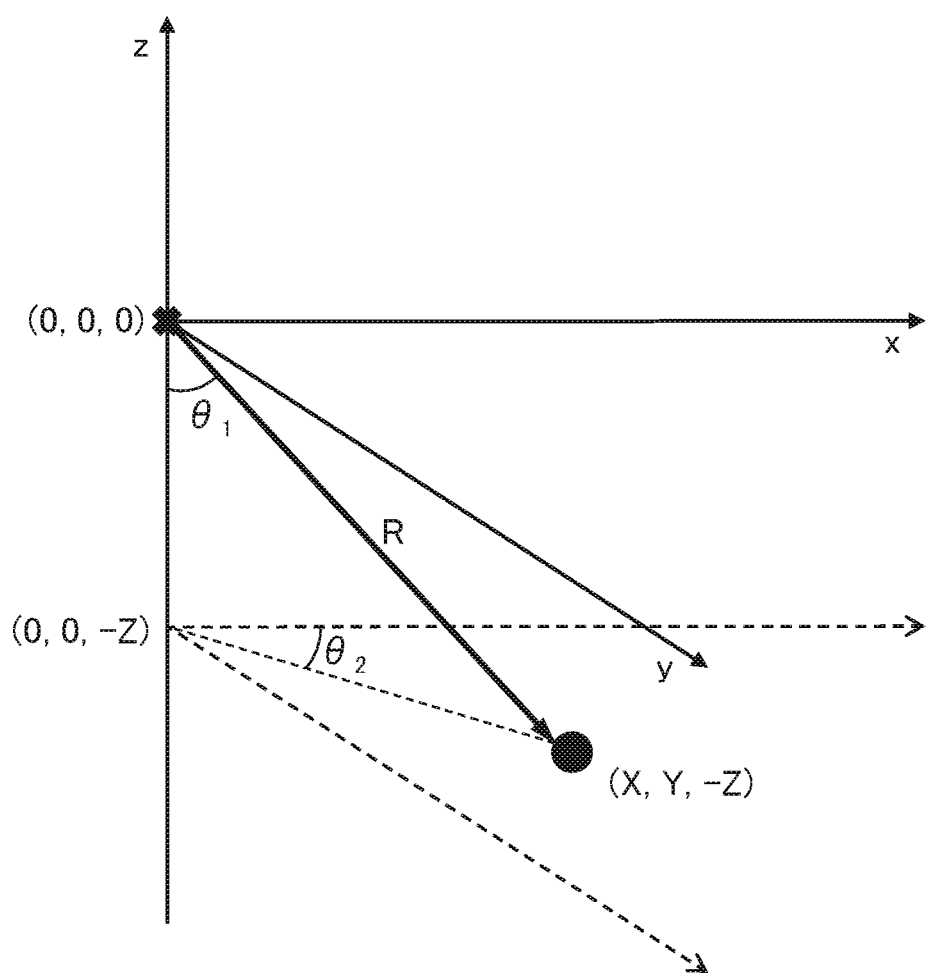
FIG. 10 is a diagram for describing a parameter when the position measurement device according to the first example embodiment of the present invention uses a three-dimension polar coordinate.

The above is the description of details of the components of the position measurement device 1 according to the present example embodiment. Note that, although a two-dimensional coordinate system is used in the above description in order to simplify the description, the scheme according to the present example embodiment may replace the two-dimensional coordinate system with a two-dimensional polar coordinate illustrated in FIG. 9 or a three-dimensional coordinate system illustrated in FIG. 10. In the example of FIG. 9, a position indicated by (X, Y) in the two-dimensional coordinate system is indicated by (r cos θ, r sin θ) in the two-dimensional polar coordinate. Moreover, in the example of FIG. 10, a position indicated by (X, Y, −Z) in the three-dimensional coordinate system is indicated by (R sin $\theta_1 \cos \theta_2$, R sin $\theta_1 \sin \theta_2$, −R cos $\theta_1$) in a three-dimensional polar coordinate. Note that, although an example in which an antenna is located at an origin of each coordinate system is illustrated in each of FIGS. 9 and 10, an origin of each coordinate system may be set at a position other than a position of the antenna.

(Operation)

Figure 11:
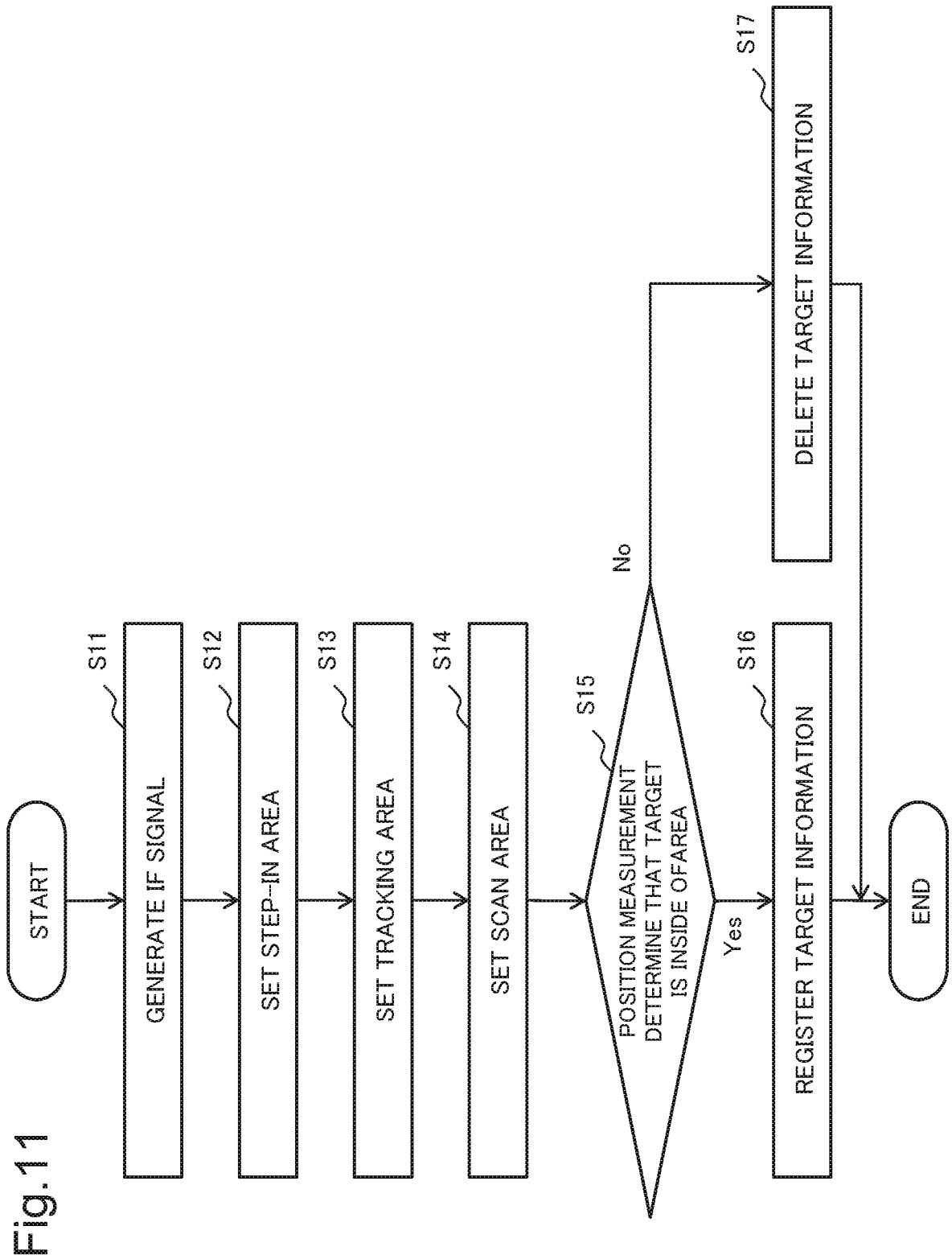
FIG. 11 is a flowchart for describing an operation of the position measurement device according to the first example embodiment of the present invention.

Next, an operation of the position measurement device 1 according to the present example embodiment is described with reference to the drawings. FIG. 11 is a flowchart for describing the operation of the position measurement device 1. Note that, although a component of the position measurement device 1 is designated as an operation agent below, the position measurement device 1 itself may be designated as an operation agent.

The flowchart in FIG. 11 illustrates processing from a point of receiving a reflected wave of an electromagnetic wave sent toward a measurement target area to a point of performing position measurement of a target using a signal of the reflected wave. The processing in the flowchart in FIG. 11 may be regularly executed, or may be irregularly executed. For example, the position measurement device 1 repeatedly executes the processing in the flowchart in FIG. 11 every second.

In FIG. 11, first, the beat signal generation unit 13 generates an IF signal by mixing, for each pair of transmission/reception antennas, a transmission signal generated by the signal transmission unit 11 with a reception signal received by the signal reception unit 12 (step S11). The beat signal generation unit 13 outputs the generated IF signal to the position measurement unit 17.

Next, the step-in area setting unit 151 acquires area information from the information storage unit 14 in response to a request from the position measurement unit 17, and sets a step-in area, based on the acquired area information (step S12). The step-in area setting unit 151 outputs the set step-in area to the position measurement unit 17.

When a set step-in area is fixed, the step-in area setting unit 151 is able to set a step-in area as follows. For example, the step-in area setting unit 151 acquires specific area coordinates and a step-in coordinates in FIG. 4, and sets, to a step-in area, a region between a line connecting the specific area coordinates and a line connecting the step-in coordinates. Moreover, for example, the step-in area setting unit 151 acquires specific area coordinates and a step-in range in FIG. 4, and sets, to a step-in area, a region within the step-in range from a line connecting the specific area coordinates.

When a step-in area dynamically changes, the step-in area setting unit 151 is able to set a step-in area as follows. For example, the step-in area setting unit 151 acquires specific area coordinates, a target speed, and a previous scan time in FIG. 4, determines width from a line connecting the specific area coordinates using an elapsed time from previous scan, and the target speed, and sets a step-in area. The step-in area setting unit 151 calculates a step-in area range by applying, to Equation 1, the target speed, and a difference time between the previous scan time and a current time. Then, the step-in area setting unit 151 updates all scan times in the information storage unit 14 to the current time.

Next, the tracking area setting unit 153 acquires target information from the information storage unit 14 in response to a request from the position measurement unit 17, and sets a tracking area (step S13). The tracking area setting unit 153 outputs the set tracking area to the position measurement unit 17. Note that a target identifier associated with a target position may be acquired from the information storage unit 14 and then output to the position measurement unit 17 by the tracking area setting unit 153, or may be acquired from the information storage unit 14 by the position measurement unit 17.

When a tracking area is fixed, for example, the tracking area setting unit 153 acquires a target position and a tracking range in FIG. 4. Then, the tracking area setting unit 153 sets, to a tracking area, a region in a circle with a radius of the tracking range around the target position.

When a tracking area dynamically changes, the tracking area setting unit 153 is able to set a tracking area as follows. For example, the tracking area setting unit 153 acquires a target position, a target speed, and a previous scan time in FIG. 4, and determines a tracking range from an elapsed time from previous scan, and the target speed. Then, the tracking area setting unit 153 sets, to a tracking area, a region in a circle with a radius of the tracking range around the target position.

The tracking area setting unit 153 calculates a tracking range by applying, to Equation 2, the target speed, and a difference time between the previous scan time and the current time. Moreover, for example, the tracking area setting unit 153 is able to set a tracking area also by acquiring, from the information storage unit 14, past position information of a target and information of a time at which the target has been present at the position, and performing movement prediction based on a movement prediction model. When the number of targets being tracked is N, the tracking area setting unit 153 sets a tracking area in relation to each target, and sets, to a tracking area, a union of tracking areas each set in relation to each target.

Next, the position measurement unit 17 sets a scan area to be a scan target, by use of the step-in area acquired from the step-in area setting unit 151, and the tracking area acquired from the tracking area setting unit 153 (step S14). The position measurement unit 17 calculates a scan area by applying the step-in area and the tracking area to Equation 4 or 5.

Next, the position measurement unit 17 performs position measurement for all sections inside the scan area, and determines whether a target is located inside the specific area A12 (step S15). The position measurement unit 17 calculates a position spectrum by use of Equation 10, for all the sections inside the scan area, by using the condition of Expression 6. The position measurement unit 17 determines that a target is located in a section in which intensity of a position spectrum exceeds a threshold value.

When determining that a target is located inside the specific area A12 (Yes in step S15), the position measurement unit 17 registers position information (target position) of the target in the information storage unit 14 (step S16). Note that, in relation to a newly detected target, the position measurement unit 17 registers an identifier (target identifier) of the target in the information storage unit 14 in association with the position information.

On the other hand, when determining that a target is located outside the specific area A12 (No in step S15), the position measurement unit 17 deletes information about the target from the information storage unit 14 (step S17). Specifically, the position measurement unit 17 deletes, from the information storage unit 14, position information of a target coinciding with an identifier (target identifier) of the target determined to be located outside the specific area A12, together with the identifier.

The above is the description of the operation of the position measurement device 1 according to the present example embodiment.

(Advantageous Effect)

As above, the position measurement device according to the present example embodiment executes position measurement in relation to a scan area including a tracking area and a step-in area of a target already detected in previous position measurement. Thus, the position measurement device according to the present example embodiment is able to thoroughly detect, in a step-in area, a target entering a specific area, while tracking a target located inside the specific area.

With a general scheme, position measurement is performed for all sections of a specific area. On the other hand, the scheme according to the present example embodiment reduces a region to be scanned, by restricting to a tracking area and a step-in area and thus performing position measurement, and therefore, is able to shorten a required time of a scan.

In other words, according to the present example embodiment, a first advantageous effect that a scan time can be shortened can be acquired. A reason for this is that position measurement is performed in a step-in area set along an inner periphery of a boundary of a specific area, and therefore, processing is completed in a short time as compared with a case where position measurement is performed for all sections of the specific area.

Furthermore, according to the present example embodiment, a second advantageous effect that a target entering a specific area can be detected in real time can be acquired. A reason for this is that a target entering a specific area can be thoroughly detected in a step-in area.

(Related Art)

Herein, a related art of the scheme according to the present example embodiment is described with reference to the drawings.

Figure 12:
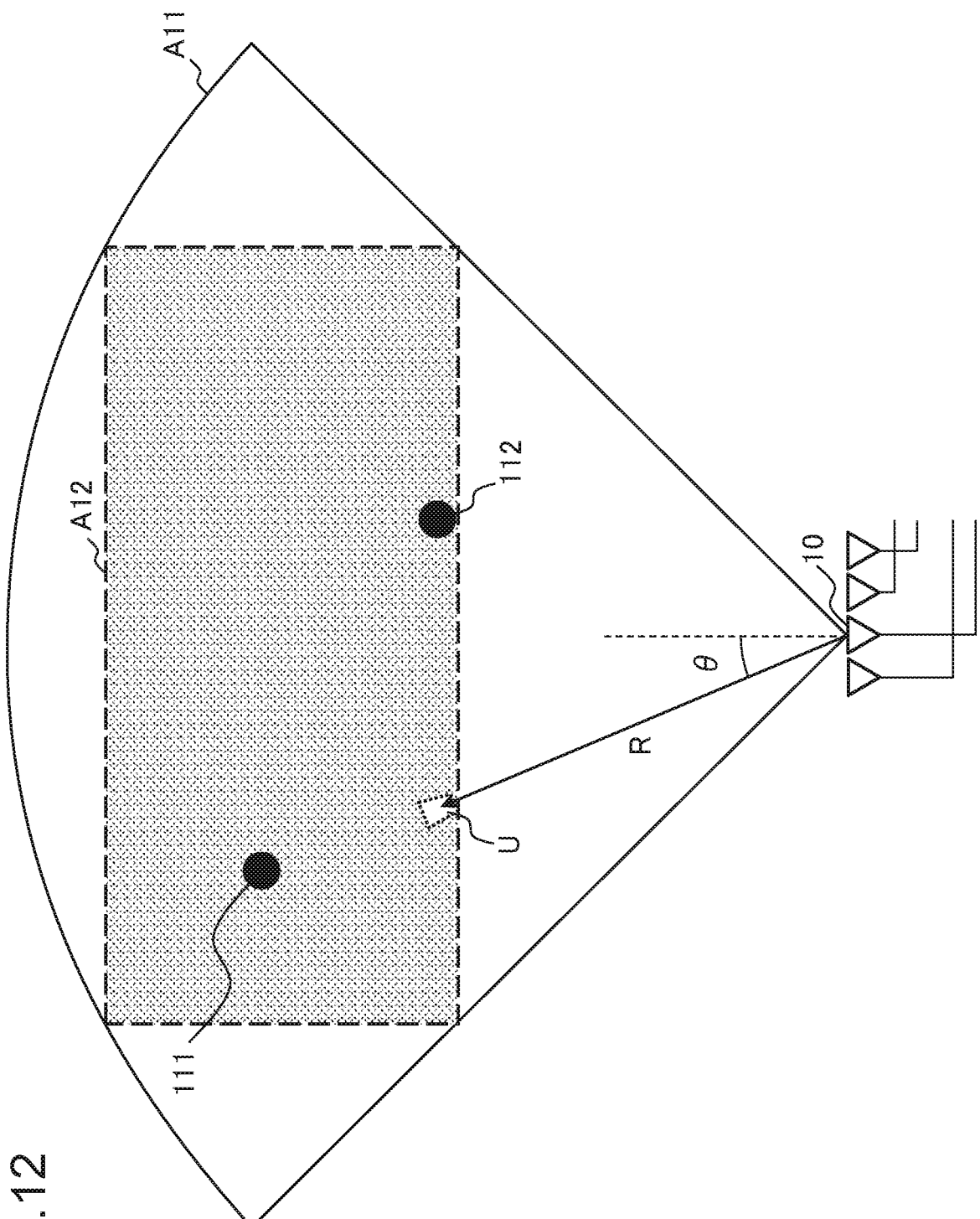
FIG. 12 is a conceptual diagram for describing a position measurement method in a general position measurement scheme.

FIG. 12 is an example of receiving a reflected wave of an electromagnetic wave transmitted from a transmission/reception antenna 10, and scanning all sections of the specific area A12. A scheme in FIG. 12 is able to determine presence or absence of the target 111 by scanning each section U uniquely determined by a distance R and an angle θ from the transmission/reception antenna 10, and measuring spectral intensity of the section U. The example of FIG. 12 has a time to scan all sections of the specific area A12. For example, assuming that the number of sections included in the specific area A12 is $N_{section}$, and a scan time required for position measurement for one section is $T_{scan}$, a total scan time $T_{total}$ is calculated by Equation 11.

$$T_{total} = N_{section} \times T_{scan} \quad (11)$$

In this way, the scheme in FIG. 12 scans all sections of the specific area A12, and therefore, requires time to detect the target 112 entering the specific area A12 within one position measurement time (total scan time $T_{total}$).

Figure 13:
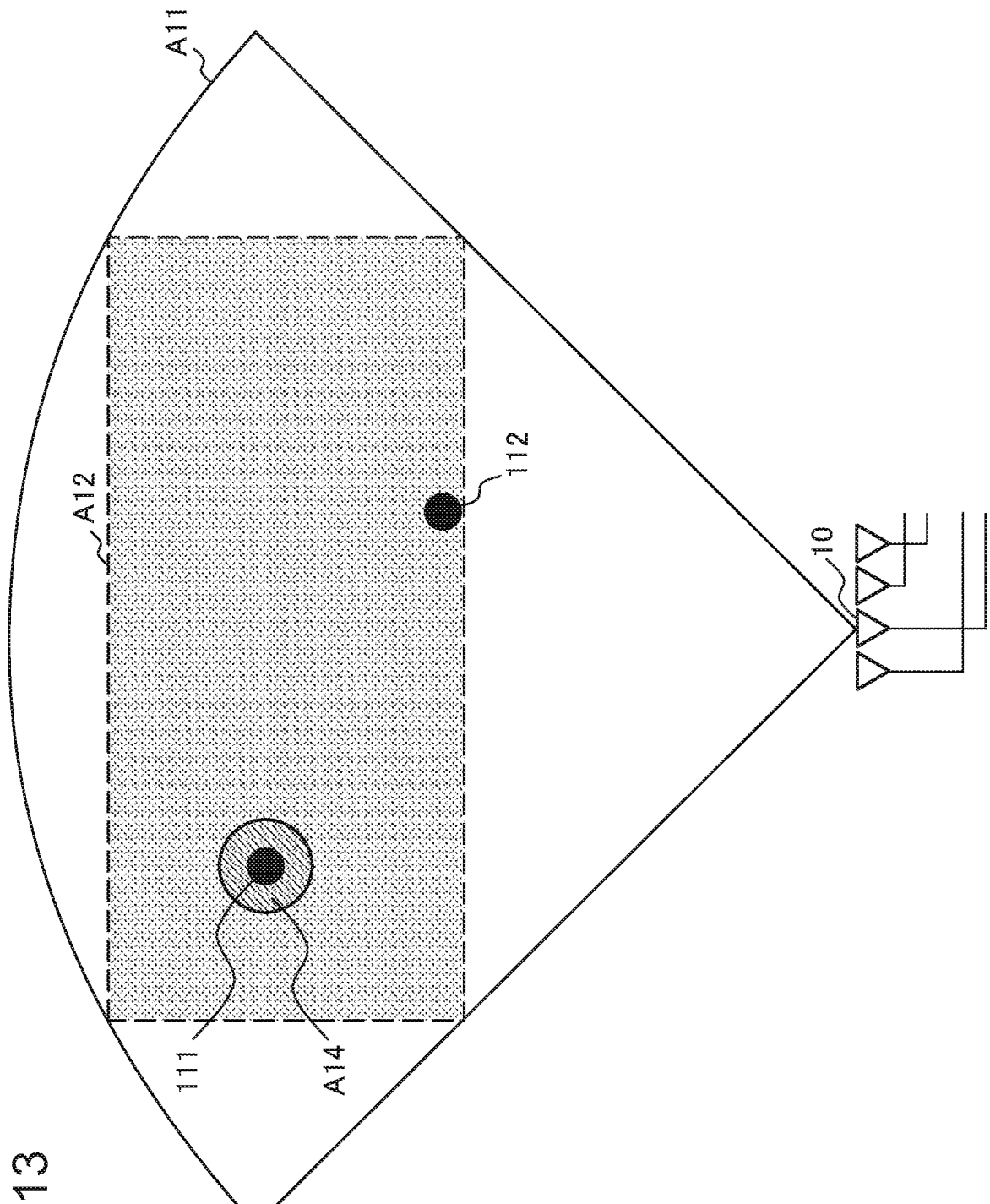
FIG. 13 is a conceptual diagram for describing a tracking method in a general position measurement scheme.

FIG. 13 is an example of, when performing position measurement for all sections of a specific area with the scheme in FIG. 12 and then detecting the target 111, tracking the detected target 111. In the example of FIG. 13, all sections inside the specific area A12 are scanned by low-frequency position measurement. Then, when the target 111 is detected inside the specific area, a range (the tracking area A15) in which the target 111 is estimated to move is tracked by high-frequency position measurement in next position measurement.

A scheme in FIG. 13 enables to shorten a scan time by tracking the target 111 with concentration. However, the scheme in FIG. 13 does not enable to measure, in real time, a position of a target entering the specific area A12 in a period of tracking the target 111 with concentration.

Moreover, the scheme in FIG. 13 scans all sections inside the specific area A12 by low-frequency position measurement, and therefore, when a wait time of position measurement is prolonged too much, detection of a target entering the specific area A12 during the wait time is delayed.

Further, the schemes in FIGS. 12 and 13 enables to increase measurement accuracy of position measurement by setting a fine interval between distance measurement and angle measurement. However, scanning too finely increases the number of sections to be scanned, and prolongs a required time for scanning.

The scheme according to the present example embodiment sets a step-in area in line with a boundary of a specific area, and performs position measurement of a target in the step-in area. Since a target always passes through the step-in area when entering the specific area, a target entering the specific area can be thoroughly detected. Moreover, in the scheme according to the present example embodiment, a target can be certainly detected in a step-in area by providing the step-in area in line with a distance in which the target moves in a scan time interval. Moreover, the scheme according to the present example embodiment enables to shorten a required time for position measurement by scanning a section inside a step-in area with concentration. In other words, the present example embodiment enables to shorten a scan time by performing position measurement of a limited scan area while tracking a detected target.

Second Example Embodiment

Next, a position measurement device according to a second example embodiment of the present invention is described with reference to the drawings. The present example embodiment is different from the first example embodiment in including a pre-scan function of measuring at least either a distance or a direction of a target.

(Configuration)

Figure 14:
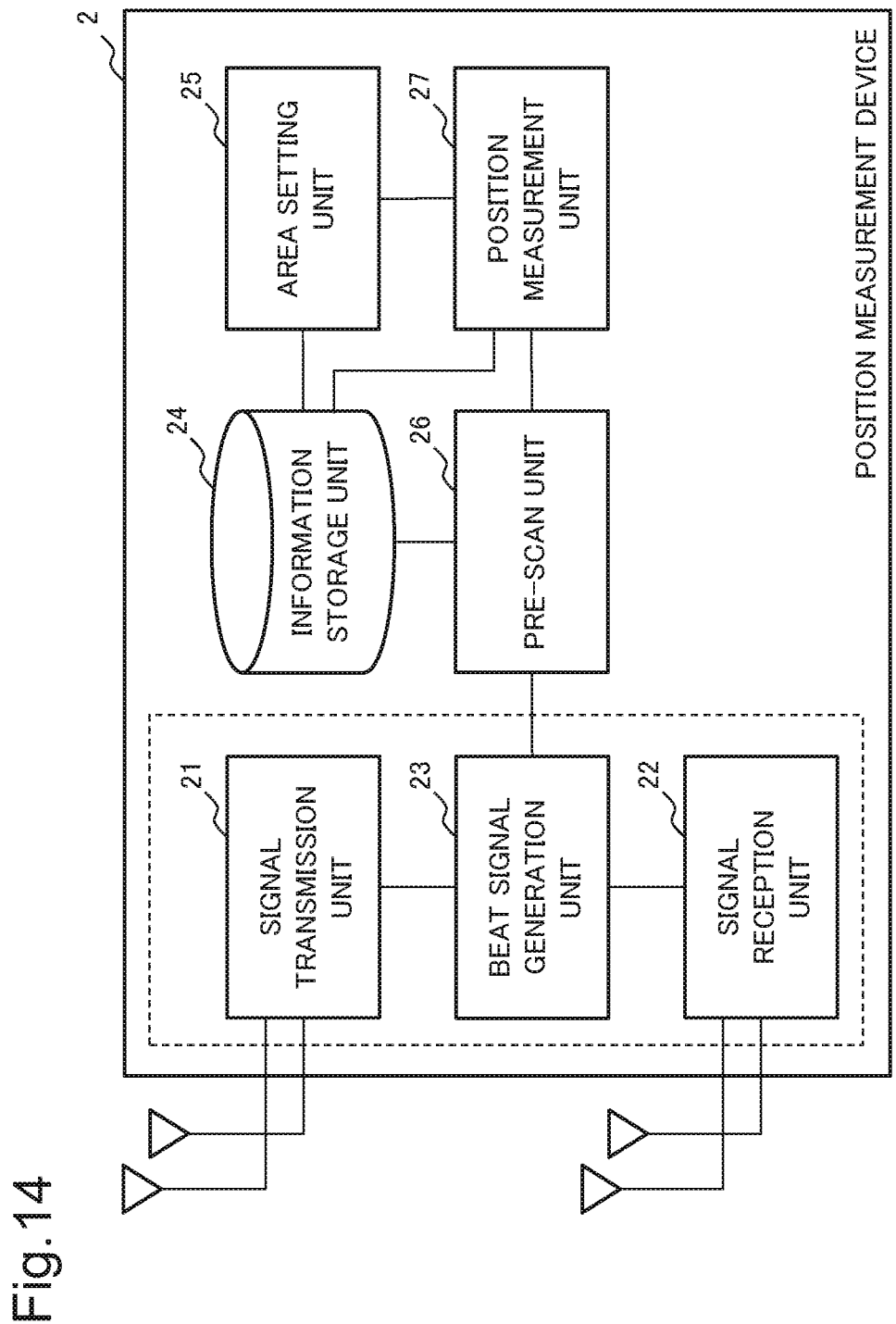
FIG. 14 is a block diagram illustrating a configuration of a position measurement device according to a second example embodiment of the present invention.

FIG. 14 is a block diagram illustrating a configuration of a position measurement device 2 according to the present example embodiment. As in FIG. 14, the position measurement device 2 includes a signal transmission unit 21, a signal reception unit 22, a beat signal generation unit 23, an information storage unit 24, an area setting unit 25, a pre-scan unit 26, and a position measurement unit 27.

The signal transmission unit 21, the signal reception unit 22, the information storage unit 24, and the area setting unit 25 are similar to the corresponding components of the position measurement device 1 according to the first example embodiment, and therefore, description thereof is omitted.

The beat signal generation unit 23 is similar to the component of the position measurement device 1, but is different from the position measurement device 1 in outputting a generated IF signal to the pre-scan unit 26.

The pre-scan unit 26 performs at least either distance measurement or direction measurement before position measurement by the position measurement unit 27, and determines whether a target is located inside the specific area.

When a target is detected in a specific area, the pre-scan unit 26 outputs a range spectrum or an IF signal to the position measurement unit 27. Note that, when a target is detected in a specific area, the pre-scan unit 26 may output distance information and direction information of the target to the position measurement unit 27, in addition to a range spectrum or an IF signal.

On the other hand, when no target is detected in a specific area, the pre-scan unit 26 deletes target information held in the information storage unit 24.

Figure 15:
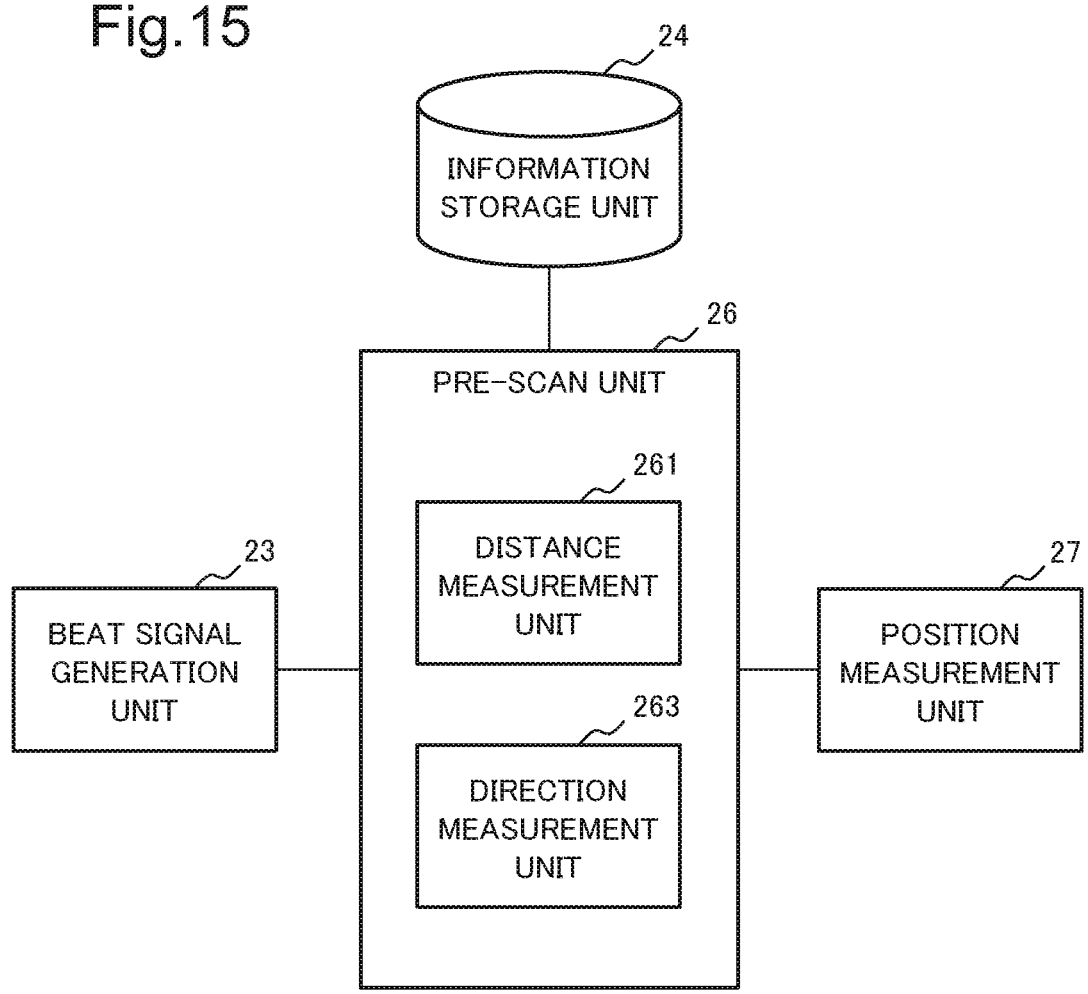
FIG. 15 is a block diagram illustrating a configuration of a pre-scan unit of the position measurement device according to the second example embodiment of the present invention.

As in FIG. 15, the pre-scan unit 26 includes a distance measurement unit 261 which measures a distance to a target, and a direction measurement unit 263 which measures a direction of a target.

The distance measurement unit 261 measures a distance to a target, and determines whether the target is located inside a specific area.

When a target is detected in a specific area, the distance measurement unit 261 outputs an IF signal or a range spectrum to the position measurement unit 27. In this instance, the distance measurement unit 261 may output acquired distance information of the target to the position measurement unit 27. Note that the distance information of the target may have a plurality of candidates. On the other hand, when no target is detected in a specific area, the distance measurement unit 261 deletes information about the target held in the information storage unit 24.

For example, the distance measurement unit 261 calculates a range spectrum by use of Equation 7. The distance measurement unit 261 determines presence or absence of a target by determining whether or not the acquired spectrum has a peak exceeding a set threshold value. When a distance r calculated using Equation 8 has a value indicating inside of a specific area $A_{interest}$ with regard to a difference frequency ΔF having spectral intensity exceeding a threshold value, the distance measurement unit 261 outputs a range spectrum $P_{range}(r)$ of the difference frequency ΔF to the position measurement unit 27. Note that the distance measurement unit 261 determines whether the distance r is inside the specific area, by whether the distance r is included in a set in Expression 12.

$$\{U(r_{interest}, \theta_{interest})|(r_{interest} \times \cos \theta_{interest}, r_{interest} \times \sin \theta_{interest}) \in A_{interest}\} \quad (12)$$

From now on, it is assumed that the distance r associated with difference frequencies $\Delta F_1$ to $\Delta F_M$ of a range spectrum exceeding a threshold value is a set represented by Expression 13 (M is a natural number).

$$\{r_{peak1}, r_{peak2}, \ldots, r_{peakM}\} \quad (13)$$

The distance measurement unit 261 outputs the set of Expression 13 and the range spectrum $P_{range}(r)$ to the position measurement unit 27.

The direction measurement unit 263 performs direction-of-arrival estimation for an IF signal, measures a direction of a target from an acquired angle spectrum, and determines whether a target is located inside a specific area.

When a target detects a target inside a specific area, the direction measurement unit 263 outputs an IF signal to the position measurement unit 27. On the other hand, when no target is detected in a specific area, the direction measurement unit 263 deletes target information held in the information storage unit 24, in a way similar to the distance measurement unit 261. In this instance, the direction measurement unit 263 may output acquired direction information of the target to the position measurement unit 27. Note that the direction information of the target may have a plurality of candidates.

In the first example embodiment, the correlation matrix $R_{xx}(r)$ is acquired by using the range spectrum $P_{range}(r)$ having any distance r. In the present example embodiment, a correlation matrix $R_{xx}$ is calculated by use of an IF signal. Specifically, the direction measurement unit 263 calculates an angle spectrum $P_{angle}(\theta)$ by applying the correlation matrix $R_{xx}$ to Equation 14, by using a beamformer method being a direction-of-arrival estimation method. Note that the direction measurement unit 263 may use a direction-of-arrival estimation method other than the beamformer method, as in the first example embodiment. Note that θ may be in a range satisfying the condition of Expression 12.

$$P_{angle}(\theta) = \frac{a^H(\theta) \times R_{xx} \times a(\theta)}{a^H(\theta) \times a(\theta)} \quad (14)$$

The direction measurement unit 263 determines presence or absence of a target in a specific area by determining whether a spectrum acquired by Equation 14 exceeds a threshold value.

From now on, it is assumed that an angle θ of an angle spectrum exceeding a threshold value is included in a set represented by Expression 15 (N is a natural number).

$$\{\theta_{peak1}, \theta_{peak2}, \ldots, \theta_{peakN}\} \quad (15)$$

The direction measurement unit 263 outputs the set of Expression 15 and the IF signal to the position measurement unit 27.

Next, the position measurement unit 27 is described. The position measurement unit 27 includes three functions. Note that a first and third functions of the position measurement unit 27 are similar to those in the first example embodiment, and therefore, description thereof is omitted.

A second function of the position measurement unit 27 is a function of inputting an IF signal or a range spectrum from the pre-scan unit 26, and performing position measurement of a scan area by use of the input IF signal or range spectrum. Note that, when inputting an IF signal, the second function of the position measurement unit 27 is the same as the second function of the position measurement unit 27 in the first example embodiment.

When acquiring distance information or direction information of a target from the pre-scan unit 26, the position measurement unit 27 may calculate only a position spectrum regarding a distance included in the set of Expression 13 or a direction included in the set of Expression 15, at a time of calculating a position spectrum by using Equation 10.

As one example, a case where the distance measurement unit 261 detects a target in a region at a distance r from the position measurement device 2 is described. In this instance, the position measurement unit 27 acquires a range spectrum $P_{range}(r)$ having a distance r, from the distance measurement unit 261. The position measurement unit 27 calculates a correlation matrix $R_{xx}(r)$ by using the range spectrum $P_{range}(r)$, and calculates a position spectrum $P_{position}(r, \theta)$ by using Equation 10. On the other hand, the position measurement unit 27 does not calculate a position spectrum in relation to a region which is not at the distance r in the scan area.

[Measurement Target Area]

Figure 16:
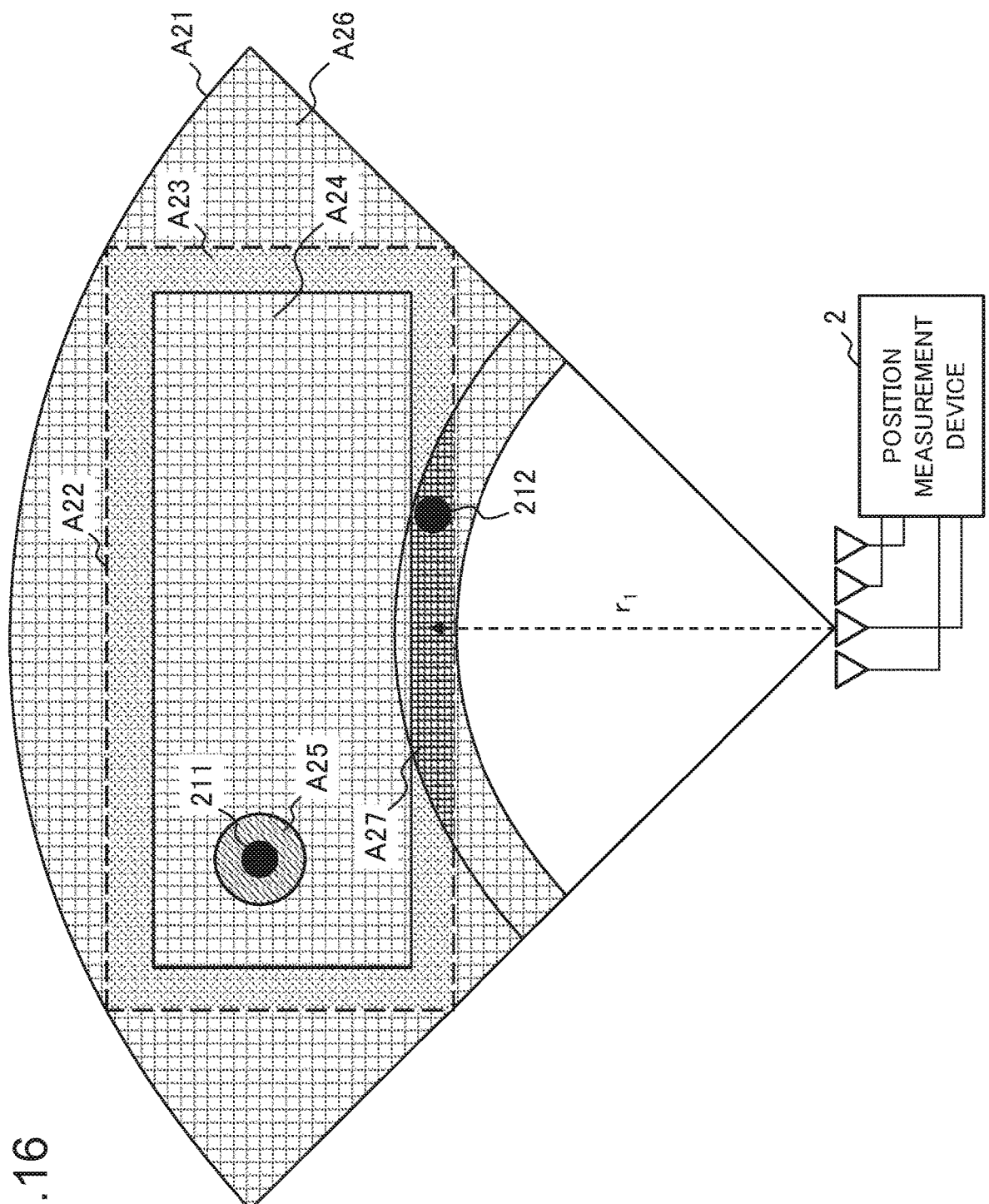
FIG. 16 is a conceptual diagram for describing a measurement target area when the position measurement device according to the second example embodiment of the present invention performs distance measurement.
Figure 17:
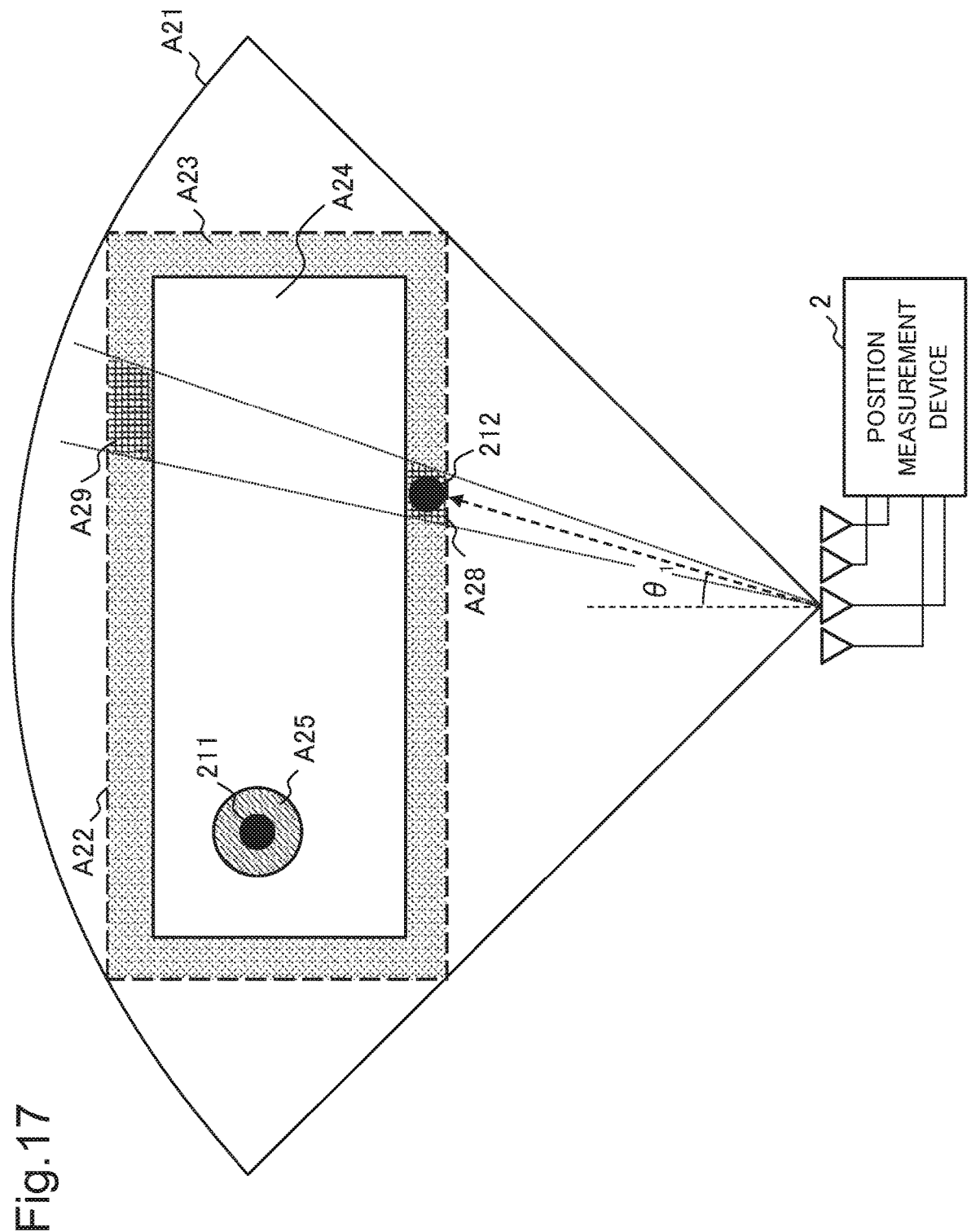
FIG. 17 is a conceptual diagram for describing a measurement target area when the position measurement device according to the second example embodiment of the present invention performs angle measurement.

Herein, a measurement target area to which a transmission signal is transmitted from the position measurement device 2 is described. FIG. 16 is an example of performing distance measurement as a pre-scan, and FIG. 17 is an example of performing direction measurement as a pre-scan.

FIG. 16 is a conceptual diagram for describing a measurement target area A21 of the position measurement device 2 when distance measurement is performed as a pre-scan. Inside the measurement target area A21, a specific area A22, a step-in area A23, an internal area A24, a tracking area A25, a pre-scan area A26, and a position measurement area A27 are set. Note that the specific area A22, the step-in area A23, the internal area A24, and the tracking area A25 are similar to those in the first example embodiment, and therefore, description thereof is omitted.

In the example of FIG. 16, a target 211 and a target 212 are located inside the specific area A22. The target 211 is a target whose position is already measured in previous position measurement. On the other hand, the target 212 is a target which has been located outside the specific area A22 in the previous position measurement, but newly entered the specific area A22 in current position measurement.

In FIG. 16, a region in a range at a distance including the specific area A22 in the measurement target area A21 is designated as the pre-scan area A26. The distance measurement unit 261 detects a target located in the pre-scan area A26, and calculates a distance between the target and the position measurement device 2.

Furthermore, in FIG. 16, the target 212 is located in a place at a distance $r_1$ from the position measurement device 2. The position measurement unit 27 performs position measurement with regard to a region (the position measurement area A27) at the distance $r_1$ from the position measurement device 2, in the scan area combining the step-in area A23 and the tracking area A25.

FIG. 17 is a conceptual diagram for describing the measurement target area A21 of the position measurement device 2 when direction measurement is performed as a pre-scan. Inside the measurement target area A21, a specific area A22, a step-in area A23, an internal area A24, a tracking area A25, a pre-scan area A28, and a pre-scan area A29 are set. Note that the specific area A22, the step-in area A23, the internal area A24, and the tracking area A25 are similar to those in the example of FIG. 16, and therefore, description thereof is omitted. Additionally, in the example of FIG. 17, a target 211 and a target 212 are located inside the specific area A22, as in the example of FIG. 16.

In the example of FIG. 17, a target located in a region (being the same as the measurement target area A21) in a range at a distance including the specific area A22 in the measurement target area A21 is detected, and a direction of the target from the position measurement device 2 can be detected. In FIG. 17, the target 212 is located in a direction at an angle $\theta_1$ from the position measurement device 2. The position measurement unit 27 performs position measurement with regard to a direction region (the pre-scan area A28 and the pre-scan area A29) at the angle $\theta_1$, in the scan area combining the step-in area A23 and the tracking area A25, and therefore, a required time for position measurement is shortened.

(Operation)

Figure 18:
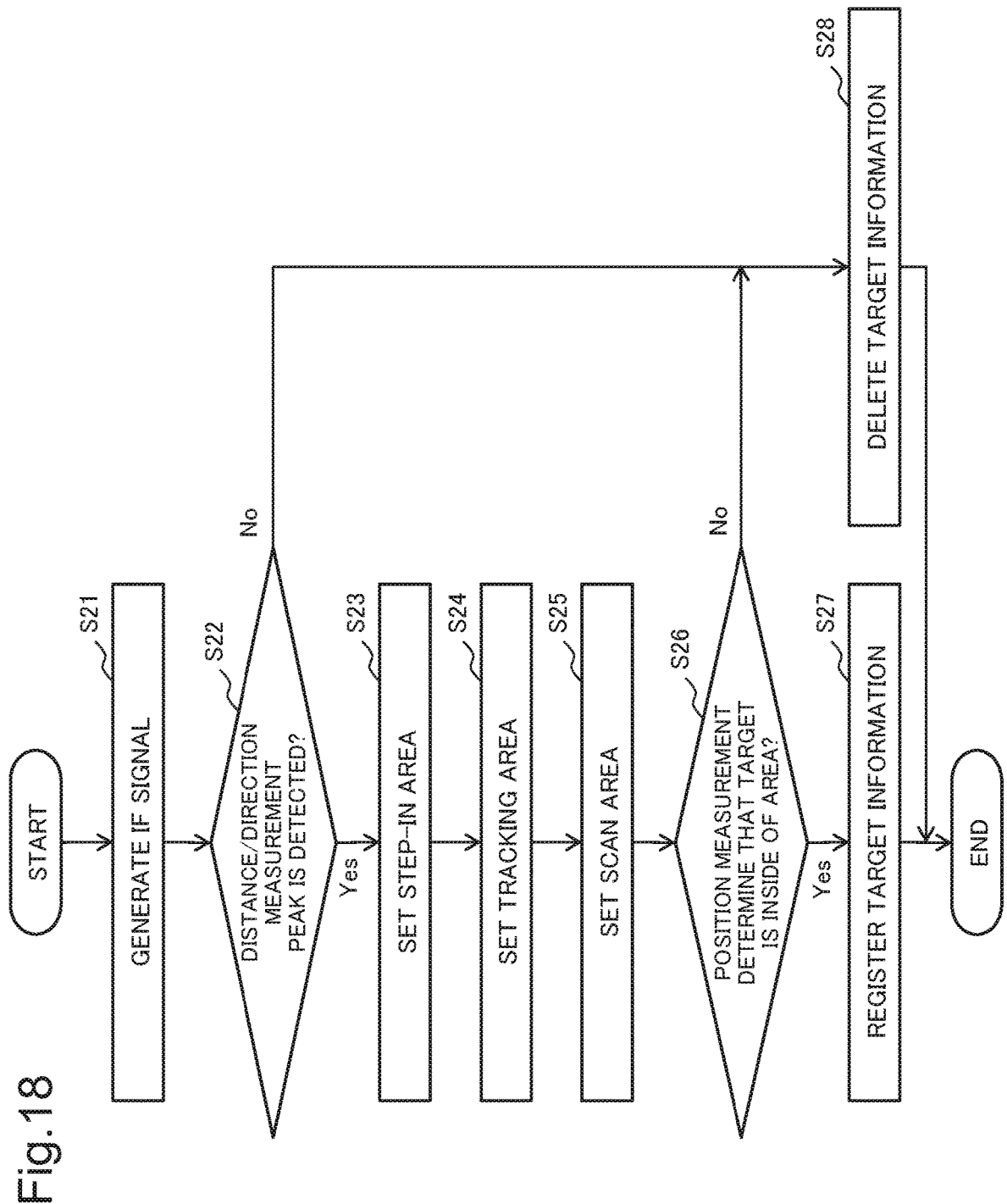
FIG. 18 is a flowchart for describing an operation of the position measurement device according to the second example embodiment of the present invention.

Next, an operation of the position measurement device 2 according to the present example embodiment is described with reference to the drawings. FIG. 18 is a flowchart for describing the operation of the position measurement device 2. Note that, although a component of the position measurement device 2 is designated as an operation agent below, the position measurement device 2 itself may be designated as an operation agent.

The flowchart in FIG. 18 illustrates processing from a point of receiving a reflected wave of an electromagnetic wave sent toward a measurement target area to a point of performing position measurement of a target by using a signal of the reflected wave, as in the first example embodiment. The processing illustrated by the flowchart in FIG. 18 is repeated appropriately.

In FIG. 18, first, the beat signal generation unit 23 generates an IF signal by mixing, for each pair of transmission/reception antennas, a transmission signal generated by the signal transmission unit 21 with a reception signal received by the signal reception unit 22 (step S21). The beat signal generation unit 23 outputs the generated IF signal to the pre-scan unit 26.

Next, the pre-scan unit 26 determines whether a target is located inside a specific area (step S22). When a target is detected inside the specific area (Yes in step S22), the operation proceeds to step S23. On the other hand, when no target is detected inside the specific area (No in step S22), the operation proceeds to step S28, and target information is deleted from the information storage unit 24 (step S28).

When direction measurement is performed as a pre-scan in step S22, the pre-scan unit 26 calculates a range spectrum using Equation 7. The pre-scan unit 26 checks presence or absence of a target inside the specific area by whether a peak of the calculated spectrum exceeds a threshold value.

When following two conditions are satisfied (equivalent to Yes in step S22), the pre-scan unit 26 outputs the IF signal or the range spectrum $P_{range}(r)$ to the position measurement unit 27. A first condition is a condition that spectral intensity exceeds a threshold value at a difference frequency $\Delta F$ of the range spectrum. The second condition is a condition that a distance r associated with the $\Delta F$ acquired by Equation 8 is a value indicating inside of the specific area $A_{interest}$. In this instance, the pre-scan unit 26 may output distance information of a target to the position measurement unit 27.

Furthermore, when direction measurement is performed as a pre-scan in step S22, the pre-scan unit 26 performs direction-of-arrival estimation for the IF signal, and measures a direction from an acquired angle spectrum to a target. The pre-scan unit 26 calculates a correlation matrix $R_{xx}$ by using the IF signal, and calculates an angle spectrum $P_{angle}(\theta)$ by applying the calculated correlation matrix $R_{xx}$ to Equation 14.

The pre-scan unit 26 checks presence or absence of a target inside the specific area A22 by whether a peak of the calculated spectrum exceeds a threshold value.

When determining, by the direction measurement, that a target is present inside the specific area A22 (equivalent to Yes in step S22), the pre-scan unit 26 outputs the IF signal to the position measurement unit 27.

In this instance, the pre-scan unit 26 may output direction information of the target to the position measurement unit 27.

As in the first example embodiment, the area setting unit 25 acquires area information from the information storage unit 24 in response to a request from the position measurement unit 27, and sets a step-in area, based on the acquired area information (step S23). The area setting unit 25 outputs the set step-in area to the position measurement unit 27.

Furthermore, as in the first example embodiment, the area setting unit 25 acquires target information from the information storage unit 24 in response to a request from the position measurement unit 27, and sets a tracking area (step S24). The area setting unit 25 outputs the set tracking area to the position measurement unit 27.

As in the first example embodiment, the position measurement unit 27 acquires the step-in area and the tracking area from the area setting unit 25. As in the first example embodiment, the position measurement unit 27 sets a scan area to be a scan target, by using the acquired step-in area and tracking area (step S25).

The position measurement unit 27 calculates position spectrums for all sections of the scan area by using the IF signal or range spectrum acquired from the pre-scan unit 26, and determines whether a target is located inside the specific area A22 (step S26). In this instance, the position measurement unit 27 may perform position measurement exclusively for a section coinciding with the distance information or the direction information of the target being an input from the pre-scan unit 26.

When determining that a target is located inside the specific area A22 (Yes in step S26), the position measurement unit 27 registers position information (target position) of the target in the information storage unit 24, as in the first example embodiment (step S27).

On the other hand, when determining that a target is located outside the specific area A22 (No in step S26), the position measurement unit 27 deletes information about the target from the information storage unit 24 (step S28).

The above is the description of the operation of the position measurement device 2 according to the present example embodiment.

(Advantageous Effect)

As above, in the present example embodiment, position measurement is not performed when no target is detected in a pre-scan. In other words, in the present example embodiment, when a target is located inside a specific area, a distance or a direction of the target is calculated by a pre-scan, and position measurement is performed in the position measurement unit in relation to a limited distance or direction in a scan area. Thus, according to the present example embodiment, a scan time can be shortened by reducing unnecessary position measurement, as compared with the first example embodiment.

Third Example Embodiment

Next, a position measurement device according to a third example embodiment of the present invention is described with reference to the drawings. The position measurement device according to the present example embodiment is different from that according to the first example embodiment in including a pre-scan function of measuring either a distance or a direction of a target located in a step-in area, and in skipping position measurement itself when no target is detected in a pre-scan.

(Configuration)

Figure 19:
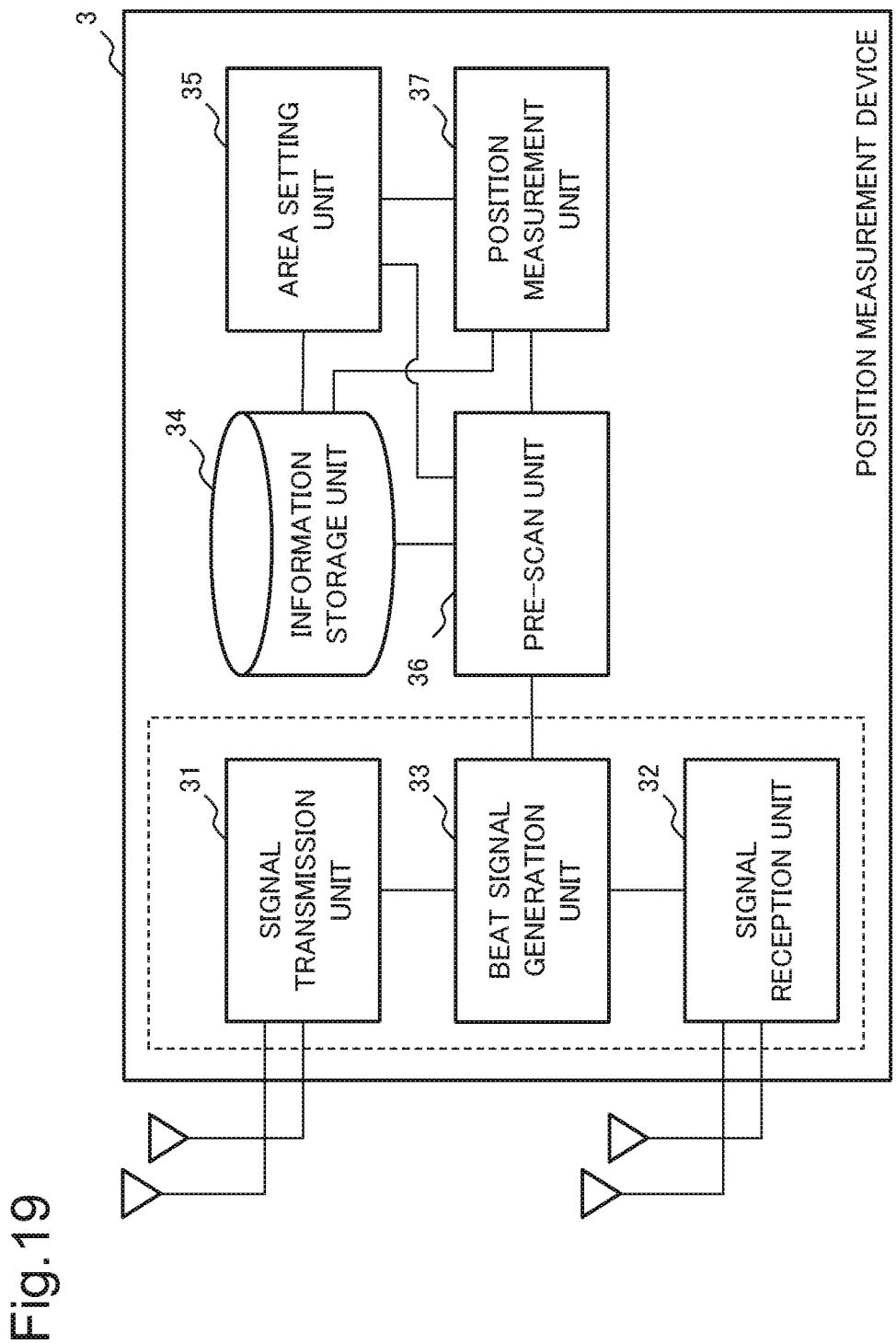
FIG. 19 is a block diagram illustrating a configuration of a position measurement device according to a third example embodiment of the present invention.

FIG. 19 is a block diagram illustrating a configuration of a position measurement device 3 according to the present example embodiment. As in FIG. 19, the position measurement device 3 includes a pre-scan unit 36, in addition to a signal transmission unit 31, a signal reception unit 32, a beat signal generation unit 33, an information storage unit 34, an area setting unit 35, and a position measurement unit 37.

The signal transmission unit 31, the signal reception unit 32, and the information storage unit 34 are similar to components of the position measurement device 1 according to the first example embodiment, and therefore, description thereof is omitted.

The beat signal generation unit 33 is similar to the component of the position measurement device 1, but is different from the position measurement device 1 in outputting a generated IF signal to the pre-scan unit 36.

The area setting unit 35 is similar to the component of the position measurement device 1, but is different from the position measurement device 1 in outputting a step-in area to the pre-scan unit 36.

The pre-scan unit 36 acquires a step-in area from the area setting unit 35. The pre-scan unit 36 separates the acquired step-in area into a distance measurement area for pre-scanning by distance measurement, and a direction measurement area for pre-scanning by direction measurement. Note that a step-in area is equivalent to a sum of a distance measurement area and a direction measurement area.

Then, the pre-scan unit 36 performs, before position measurement by the position measurement unit 37, distance measurement in relation to a distance measurement area and direction measurement in relation to a direction measurement area, and determines whether a target is located inside the step-in area.

When a target is detected in the step-in area, the pre-scan unit 36 outputs a range spectrum or an IF signal to the position measurement unit 37. Note that, when a target is detected in the step-in area, the pre-scan unit 36 may output distance information or direction information of the target to the position measurement unit 37, in addition to a range spectrum or an IF signal.

On the other hand, when no target is detected inside the step-in area, the pre-scan unit 36 deletes target information held in the information storage unit 34.

Figure 20:
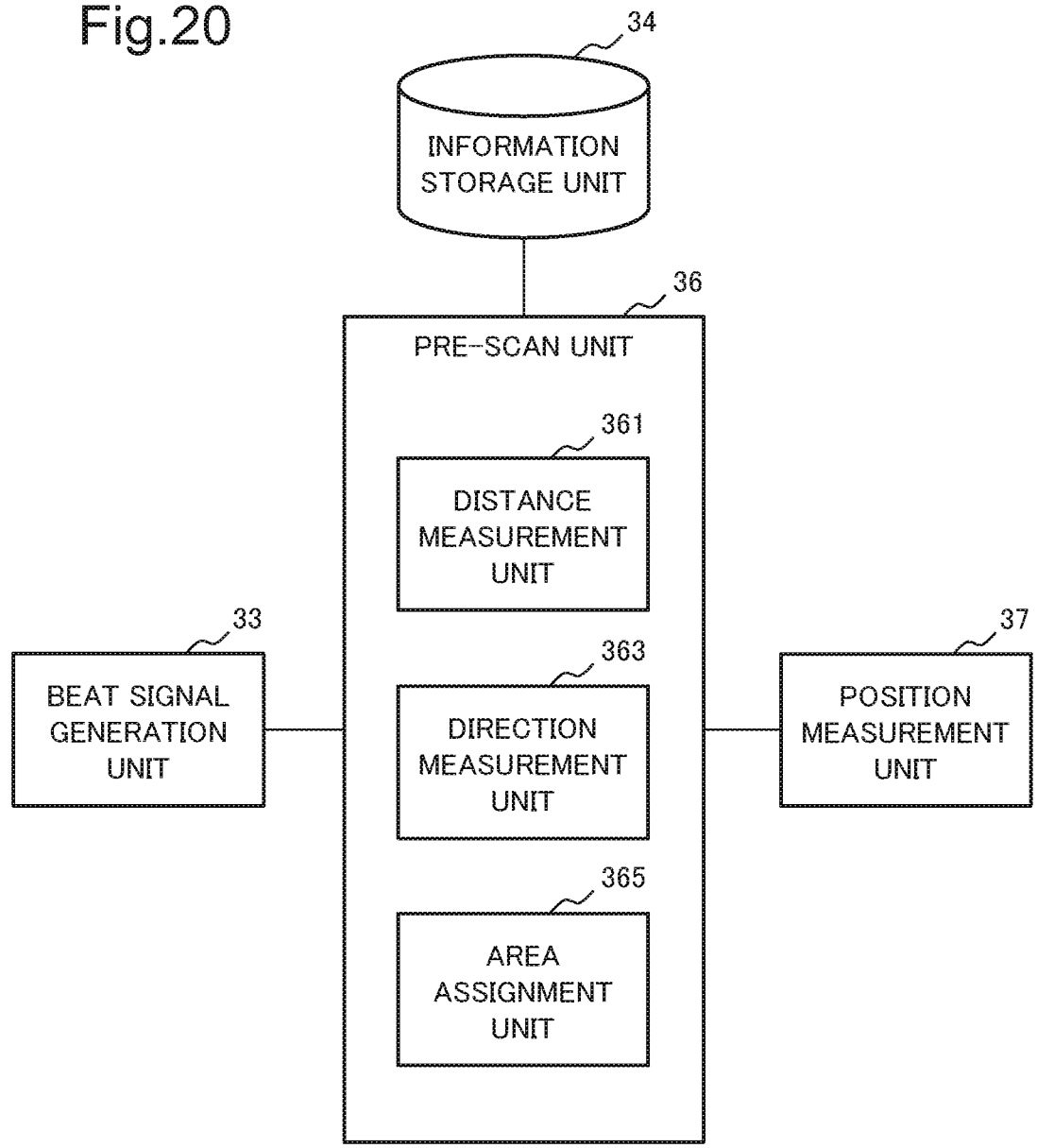
FIG. 20 is a block diagram illustrating a configuration of a pre-scan unit of the position measurement device according to the third example embodiment of the present invention.

Herein, a detailed configuration of the pre-scan unit 36 is described. As in FIG. 20, the pre-scan unit 36 includes a distance measurement unit 361, a direction measurement unit 363, and an area assignment unit 365.

The distance measurement unit 361 acquires an IF signal from the beat signal generation unit 33. The distance measurement unit 361 performs distance measurement in relation to a distance measurement area assigned by the area assignment unit 365, and determines whether a target is located inside the distance measurement area.

The distance measurement unit 361 outputs a range spectrum to the position measurement unit 37 regardless of whether a target is located inside the distance measurement area. In this instance, the distance measurement unit 361 may output information relating to a distance of a target to the position measurement unit 37. Assuming that a distance measurement area assigned by the area assignment unit 365 is $A_{h\_step-in}$, whether a distance r is in a scan range can be determined by whether the distance r is included in a set of Expression 16.

$$\{U(r_{h\_step-in})|(r_{h\_step-in} \times \cos\theta, r_{h\_step-in} \times \sin\theta) \in A_{h\_step-in}\} \quad (16)$$

The direction measurement unit 363 acquires an IF signal from the beat signal generation unit 33. The direction measurement unit 363 performs direction measurement in relation to a direction measurement area assigned by the area assignment unit 365, and determines whether a target is located inside the direction measurement area.

The direction measurement unit 363 outputs the IF signal to the position measurement unit 37 regardless of whether a target is located inside the direction measurement area. In this instance, the direction measurement unit 363 may output information relating to a direction of a target to the position measurement unit 37. Assuming that a direction measurement area assigned by the area assignment unit 365 is $A_{v\_step-in}$, whether a direction $\theta$ is in a scan range can be determined by whether the direction $\theta$ is included in a set of Expression 17.

$$\{U(\theta_{v\_step-in})|(r \times \cos\theta_{v\_step-in}, r \times \sin\theta_{v\_step-in}) \in A_{v\_step-in}\} \quad (17)$$

The area assignment unit 365 (also referred to as an assignment unit) acquires a step-in area from the area setting unit 35, and separates the step-in area into a distance measurement area and a direction measurement area. The area assignment unit 365 outputs the distance measurement area to the distance measurement unit 361, and outputs the direction measurement area to the direction measurement unit 363.

Next, the position measurement unit 37 is described. The position measurement unit 37 includes following three functions. Note that a first and third functions of the position measurement unit 37 are similar to those in the first example embodiment, and therefore, description thereof is omitted.

A second function of the position measurement unit 37 is a function of inputting an IF signal or a range spectrum from the pre-scan unit 26, and performing position measurement of a scan area by using the input IF signal or range spectrum, as in the second example embodiment. However, in the present example embodiment, when no target is detected by the pre-scan unit 36, position measurement may be performed in a new scan area $A_{new\_scan}$ in which a step-in area $A_{step\text{-}in}$ is removed from a scan area $A_{scan}$, as in Equation 18. Moreover, an area obtained by removing the distance measurement area and the direction measurement area from the scan area $A_{scan}$ may be designated as the new scan area $A_{new\_scan}$.

$$A_{new\_scan} = A_{scan} \cap \overline{A_{step\text{-}in}} \qquad (18)$$

[Measurement Target Area]

Figure 21:
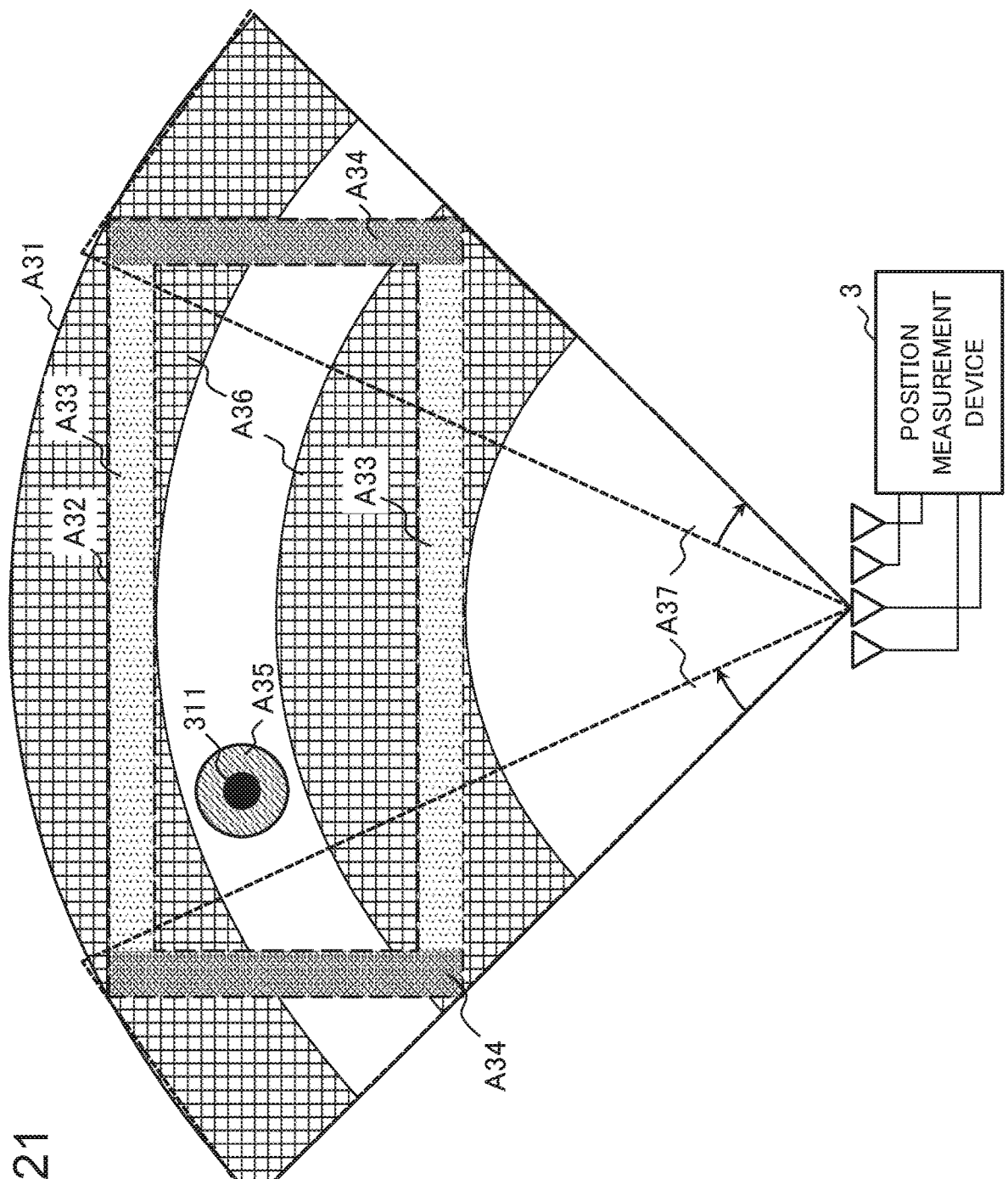
FIG. 21 is a conceptual diagram for describing a measurement target area of the position measurement device according to the third example embodiment of the present invention.

Herein, a measurement target area to which a transmission signal is transmitted from the position measurement device 3 is described. FIG. 21 is a conceptual diagram for describing a measurement target area A31 targeted for measurement by the position measurement device 3. Inside the measurement target area A31, a specific area A32, a distance measurement area A33, a direction measurement area A34, a tracking area A35, a scan range A36, and a scan range A37 are set. The distance measurement area A33 and the direction measurement area A34 configure a step-in area. Note that the specific area A32 and the tracking area A35 are similar to those in the first example embodiment, and therefore, description thereof is omitted.

In the example of FIG. 21, a target 311 located inside the specific area A32. The target 311 is a target whose position is already measured in previous position measurement.

The area assignment unit 365 outputs the distance measurement area A33 in the step-in area to the distance measurement unit 361. The distance measurement unit 361 pre-scans a scan range including the distance measurement area A33 by distance measurement. In FIG. 21, the scan range A36 is a range scanned in order to cover the distance measurement area A33. The distance measurement unit 361 outputs a range spectrum of the pre-scanned scan range A36 to the position measurement unit 37.

Furthermore, the area assignment unit 365 outputs the direction measurement area A34 in the step-in area to the direction measurement unit 363. The direction measurement unit 363 pre-scans, by direction measurement, a range including the direction measurement area A34 in the step-in area. In FIG. 21, the scan range A37 is a range scanned in order to cover the direction measurement area A34. The direction measurement unit 363 outputs an IF signal of the pre-scanned scan range A37 to the position measurement unit 37.

Note that, in the example of FIG. 21, a target is located in neither the distance measurement area A33 nor the direction measurement area A34, and therefore, position measurement may be performed for the tracking area A35 of the target 311.

(Operation)

Figure 22:
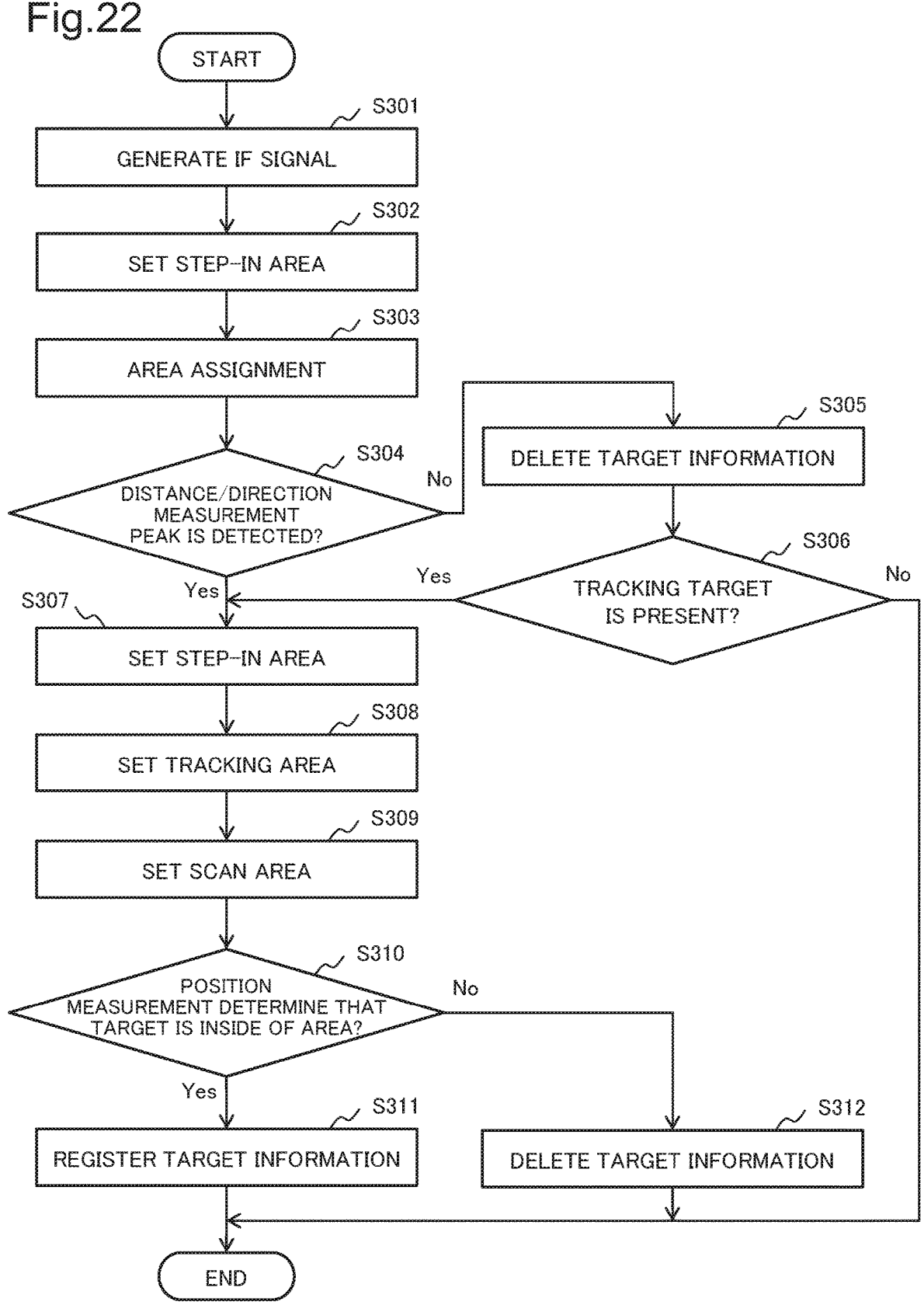
FIG. 22 is a flowchart for describing an operation of the position measurement device according to the third example embodiment of the present invention.

Next, an operation of the position measurement device 3 according to the present example embodiment is described with reference to the drawings. FIG. 22 is a flowchart for describing the operation of the position measurement device 3. Note that, although a component of the position measurement device 3 is designated as an operation agent below, the position measurement device 3 itself may be designated as an operation agent.

The flowchart in FIG. 22 illustrates processing from a point of receiving a reflected wave of an electromagnetic wave sent toward a measurement target area to a point of performing position measurement of a target by use of a signal of the reflected wave, as in the first example embodiment. The processing in the flowchart in FIG. 22 is repeated appropriately.

In FIG. 22, first, the beat signal generation unit 33 generates an IF signal by mixing, for each pair of transmission/reception antennas, a transmission signal generated by the signal transmission unit 31 with a reception signal received by the signal reception unit 32 (step S301). The beat signal generation unit 33 outputs the generated IF signal to the pre-scan unit 36.

Next, the area setting unit 35 acquires area information from the information storage unit 34 in response to a request from the pre-scan unit 36, and sets a step-in area, based on the acquired area information (step S302). The area setting unit 35 outputs the set step-in area to the pre-scan unit 36.

Next, the area assignment unit 365 of the pre-scan unit 36 separates, into a distance measurement area and a direction measurement area, the step-in area acquired from the area setting unit 35 (step S303). The area assignment unit 365 outputs the distance measurement area to the distance measurement unit 361, and outputs the direction measurement area to the direction measurement unit 363.

Next, the pre-scan unit 36 determines whether or not a target is located inside a step-in area configured by the distance measurement area and the direction measurement area (step S304). The pre-scan unit 36 outputs a range spectrum and an IF signal to the position measurement unit 37.

When detecting a target inside the step-in area (Yes in step S304), the pre-scan unit 36 notifies the position measurement unit 37 that the target is detected (the operation proceeds to step S307). When receiving the notification from the pre-scan unit 36, the position measurement unit 37 requests the area setting unit 35 to acquire the step-in area and a tracking area.

On the other hand, when no target is detected inside the step-in area (No in step S304), target information is deleted from the information storage unit 34 (step S305).

When the target information is deleted from the information storage unit 34 in step S305, the pre-scan unit 36 refers to target information in the information storage unit 34, and checks presence or absence of a target being tracked (step S306). When a target being tracked is present (Yes in step S306), the pre-scan unit 36 outputs an IF signal to the position measurement unit 37 (the operation proceeds to step S307). On the other hand, when no target being tracked is present (No in step S306), the processing along the flowchart in FIG. 22 is finished.

The area setting unit 35 acquires area information from the information storage unit 34 in response to a request from the position measurement unit 37, and sets a step-in area, based on the acquired area information (step S307). The area setting unit 35 outputs the set step-in area to the position measurement unit 37. Note that, when information about a step-in area is output from the pre-scan unit 36 to the position measurement unit 37, step S307 may be omitted.

The area setting unit 35 acquires target information from the information storage unit 34 in response to a request from the position measurement unit 37, and sets a tracking area (step S308). The area setting unit 35 outputs the set tracking area to the position measurement unit 37.

The position measurement unit 37 acquires the step-in area and the tracking area from the area setting unit 35. The position measurement unit 37 sets a scan area to be a scan target, by using the acquired step-in area and tracking area (step 309).

The position measurement unit 37 calculates position spectrums for all sections of the scan area by using the IF signal or range spectrum acquired from the pre-scan unit 36, and determines whether a target is located inside the specific area (step S310). However, when a tracking target is detected in step S306 (Yes in step S306), the position measurement unit 37 may perform position measurement only in a new scan area.

When determining that a target is located inside a specific area (Yes in step S310), the position measurement unit 37 registers position information (target position) of the target in the information storage unit 34 (step S311).

On the other hand, when determining that a target is located outside the specific area (No in step S310), the position measurement unit 37 deletes information about the target from the information storage unit 34 (step S312).

The above is the description of the operation of the position measurement device 3 according to the present example embodiment.

(Advantageous Effect)

As above, in the present example embodiment, position measurement is not performed when no target is detected in a step-in area by the pre-scan unit, in contrast to the second example embodiment. In other words, in the second example embodiment, position measurement is performed when a target is present inside a specific area, whereas, in the present example embodiment, position measurement is not performed unless the distance measurement unit and the position measurement unit sense a target even when a target is present inside a particular area. Thus, according to the present example embodiment, a scan time can be shortened by further reducing unnecessary position measurement, as compared with the second example embodiment.

(Hardware)

Figure 23:
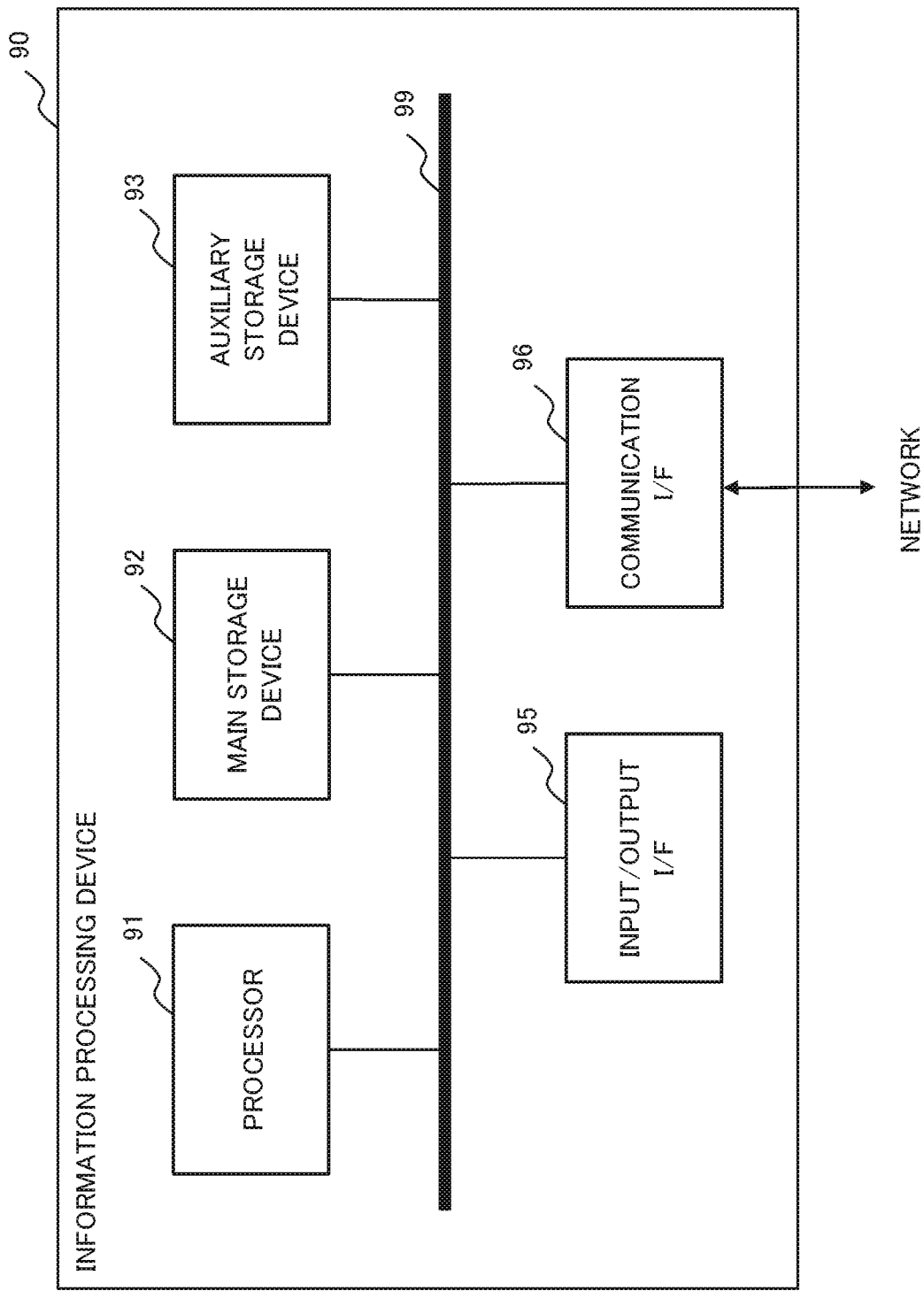
FIG. 23 is a block diagram illustrating one example of a hardware configuration which executes processing of the position measurement device according to each example embodiment of the present invention.

Herein, a hardware configuration which executes processing by the position measurement device according to each example embodiment of the present invention is described by citing an information processing device 90 in FIG. 23 as one example. Note that the information processing device 90 in FIG. 23 is a configuration example for executing processing by the position measurement device according to each example embodiment, and does not limit the scope of the present invention.

As in FIG. 23, the information processing device 90 includes a processor 91, a main storage device 92, an auxiliary storage device 93, an input/output interface 95, and a communication interface 96. In FIG. 23, an interface is abbreviated as an I/F. The processor 91, the main storage device 92, the auxiliary storage device 93, the input/output interface 95, and the communication interface 96 are data-communicably connected to one another via a bus 99. Moreover, the processor 91, the main storage device 92, the auxiliary storage device 93, and the input/output interface 95 are connected to a network such as the Internet or an intranet via the communication interface 96.

The processor 91 extracts a program stored in the auxiliary storage device 93 or the like into the main storage device 92, and executes the extracted program. In the present example embodiment, a configuration using a software program installed in the information processing device 90 may be provided. The processor 91 executes processing by the position measurement device according to the present example embodiment.

The main storage device 92 has a region where a program is deployed. The main storage device 92 may be a volatile memory such as a dynamic random access memory (DRAM). Moreover, a non-volatile memory such as a magnetoresistive random access memory (MRAM) may be configured and added as the main storage device 92.

The auxiliary storage device 93 stores various data. The auxiliary storage device 93 is configured by a local disk such as a hard disk or a flash memory. Note that the main storage device 92 may be configured in such a way as to store various data, and the auxiliary storage device 93 may be omitted.

The input/output interface 95 is an interface for connecting the information processing device 90 and peripheral equipment. The communication interface 96 is an interface for connecting to an external system or device through a network such as the Internet or an intranet, based on a standard or a specification. The input/output interface 95 and the communication interface 96 may be formed into a common interface as an interface for connecting to external device.

The information processing device 90 may be configured in such a way that input equipment such as a keyboard, a mouse, and a touch panel is connected to the information processing device 90 as required. The input equipment is used for input of information and setting. Note that, when a touch panel is used as input equipment, a display screen of display equipment may be configured in such a way as to double as an interface of the input equipment. Data communication between the processor 91 and input equipment may be mediated by the input/output interface 95.

Furthermore, the information processing device 90 may be equipped with display equipment for displaying information. When being equipped with display equipment, the information processing device 90 preferably include a display control device (not illustrated) for controlling display of the display equipment. The display equipment may be connected to the information processing device 90 via the input/output interface 95.

Still further, the information processing device 90 may be equipped with a disk drive as required. The disk drive is connected to the bus 99. Between the processor 91 and a non-illustrated recording medium (program recording medium), the disk drive mediates reading of data and a program from the recording medium, writing of a processing result of the information processing device 90 into the recording medium, and the like. The recording medium can be implemented by an optical recording medium such as a compact disc (CD) or a digital versatile disc (DVD). Additionally, the recording medium may be implemented by a semiconductor recording medium such as a universal serial bus (USB) memory or a secure digital (SD) card, a magnetic recording medium such as a flexible disk, or another recording medium.

The above is one example of a hardware configuration for enabling the position measurement device according to each example embodiment of the present invention. Note that the hardware configuration in FIG. 23 is one example of a hardware configuration for executing arithmetic processing by the position measurement device according to each example embodiment, and does not limit the scope of the present invention. Moreover, a program which causes a computer to execute processing relating to the position measurement device according to each example embodiment also falls within the scope of the present invention. Further, a program recording medium recording a program according to each example embodiment also falls within the scope of the present invention.

The components of the position measurement device according to each example embodiment can be combined in any way. Moreover, each component of the position measurement device according to each example embodiment may be implemented by software, or may be implemented by a circuit.

While the present invention has been described above with reference to the example embodiments, the present invention is not limited to the above-described example embodiments. Various changes which can be understood by a person skilled in the art can be made to a configuration and details of the present invention within the scope of the present invention.

This application is based upon and claims the benefit of priority from Japanese Patent Application No. 2017-120117, filed on Jun. 20, 2017, the disclosure of which is incorporated herein in its entirety by reference.

REFERENCE SIGNS LIST 1, 2, 3 Position measurement device
10 Transmission/reception antenna
11, 21, 31 Signal transmission unit
12, 22, 32 Signal reception unit
13, 23, 33 Beat signal generation unit
14, 24, 34 Information storage unit
15, 25, 35 Area setting unit
17, 27, 37 Position measurement unit
26, 36 Pre-scan unit
151 Step-in area setting unit
153 Tracking area setting unit
261, 361 Distance measurement unit
263, 363 Direction measurement unit
365 Area assignment unit

What is claimed is:

1. A position measurement device comprising: a storage device configured to store area information for setting a first region along a boundary of a specific area; one or more memories storing instructions; and one or more processors connected to the one or more memories and configured to execute the instructions to: acquire the area information from the storage device; set the first region, based on the acquired area information, a width between the boundary of the specific area and an inner boundary of the first region being calculated based on a speed of a target and an elapsed time since a previous position measurement time for the target; set the acquired first region to a verification region; perform a position measurement calculation of e-the target located in the verification region; and update the area information stored in the storage device.

2. The position measurement device according to claim 1, wherein: the storage device stores target information including information relating to a position of the target detected in the specific area, and the one or more processors are further configured to execute the instructions to: acquire the target information from the storage device; set, based on the target information, a second region to be following the target; and set the verification region by combining the first region and the second region.

3. The position measurement device according to claim 2, wherein the one or more processors are further configured to execute the instructions to: register, in the storage device, the target information relating to the target newly detected in the first region; and delete, from the storage device, the target information relating to the target which is not detected in the verification region including the first region and the second region.

4. The position measurement device according to claim 2, wherein: the storage device stores a-the speed of the target and a-the previous position measurement time to be included in the target information, and the one or more processors are further configured to execute the instructions to dynamically set the second region by using the acquired target information.

5. The position measurement device according to claim 2, wherein the one or more processors are further configured to execute the instructions to: receive an intermediate frequency signal generated by mixing an electromagnetic wave transmitted to the specific area and a reflected wave of the electromagnetic wave; verify presence or absence of the target in a range including the specific area by using a detection method being at least one of a distance measurement calculation—and a direction measurement calculation; delete the target information stored in the storage device when not detecting the target inside the specific area; and perform the position measurement calculation of the target located in the verification region by using a signal according to the detection method.

6. The position measurement device according to claim 5, wherein the one or more processors are further configured to execute the instructions to: acquire the intermediate frequency signal; verify presence or absence of the target in a range including the specific area based on the distance measurement calculation; and verify presence or absence of the target in a range including the specific area based on the direction measurement calculation.

7. The position measurement device according to claim 6, wherein the one or more processors are further configured to execute the instructions to: separate the acquired first region into a distance measurement region and a direction measurement region; verify presence or absence of the target in the distance measurement region based on the distance measurement calculation; and verify presence or absence of the target in the direction measurement region based on the direction measurement calculation.

8. The position measurement device according to claim 1, further comprising a mixer configured to generate an intermediate frequency signal by mixing an electromagnetic wave transmitted to the specific area and a reflected wave of the electromagnetic wave.

9. A position measurement method by one or more computers, the position measurement method comprising: setting a first region, based on area information acquired from a storage device which is configured to store the area information for setting the first region along a boundary of a specific area; setting the first region to a verification region, a width between the boundary of the specific area and an inner boundary of the first region being calculated based on a speed of a target and an elapsed time since a previous position measurement time for the target; performing position measurement of -the target located in the verification region; and updating the area information stored in the storage device.

10. A non-transitory, computer-readable medium recording a program which causes a computer to execute: processing of setting a first region, based on area information acquired from a storage device which is configured to store the area information for setting the first region along a boundary of a specific area; processing of setting the first region to a verification region, a width between the boundary of the specific area and an inner boundary of the first region being calculated based on a speed of a target and an elapsed time since a previous position measurement time for the target; processing of performing position measurement of -the target located in the verification region; and processing of updating the area information stored in the storage device.

* * * * *